United States Patent
Miyamoto et al.

(10) Patent No.: US 6,833,397 B2
(45) Date of Patent: Dec. 21, 2004

(54) METHOD FOR PRODUCING A FLAME RETARDANT POLYCARBONATE RESIN COMPOSITION

(75) Inventors: Akira Miyamoto, Kurashiki (JP); Kazuhiro Shibuya, Kurashiki (JP); Hiroshi Hachiya, Kurashiki (JP); Chung Neng Wu, Tainan (TW); Wen-Yi Su, Tainan (TW)

(73) Assignee: Asahi Kasei Chemicals Corporation, Tokyo (JP)

( * ) Notice: Subject to any disclaimer, the term of this patent is extended or adjusted under 35 U.S.C. 154(b) by 381 days.

(21) Appl. No.: 09/947,368

(22) Filed: Sep. 7, 2001

(65) Prior Publication Data

US 2002/0060378 A1 May 23, 2002

(30) Foreign Application Priority Data

Sep. 8, 2000 (JP) ........................................ 2000-273453

(51) Int. Cl.$^7$ ................................................ C08K 5/49
(52) U.S. Cl. ........................ 523/344; 524/115; 524/127
(58) Field of Search .......................... 523/344; 524/115, 524/127

(56) References Cited

U.S. PATENT DOCUMENTS 6,177,492 B1    1/2001  Takagi et al.

FOREIGN PATENT DOCUMENTS

| EP | 0 936 243 A2 | 8/1999 |
|----|-------------|--------|
| JP | 11-246721   | 9/1999 |

*Primary Examiner*—Edward J. Cain
(74) *Attorney, Agent, or Firm*—Birch, Stewart, Kolasch & Birch, LLP

(57) ABSTRACT

Disclosed is a method for producing a flame retardant polycarbonate resin composition by using a screw extruder, which comprises extruding a resin component (mainly comprising a polycarbonate) and an organic phosphorus compound having an acid value of not more than 0.1 mg KOH/g while kneading, wherein the temperature of the resin component in the extruder is not higher than 300° C., and the residence time of the resin component in the extruder is not more than 40 seconds.

13 Claims, 11 Drawing Sheets

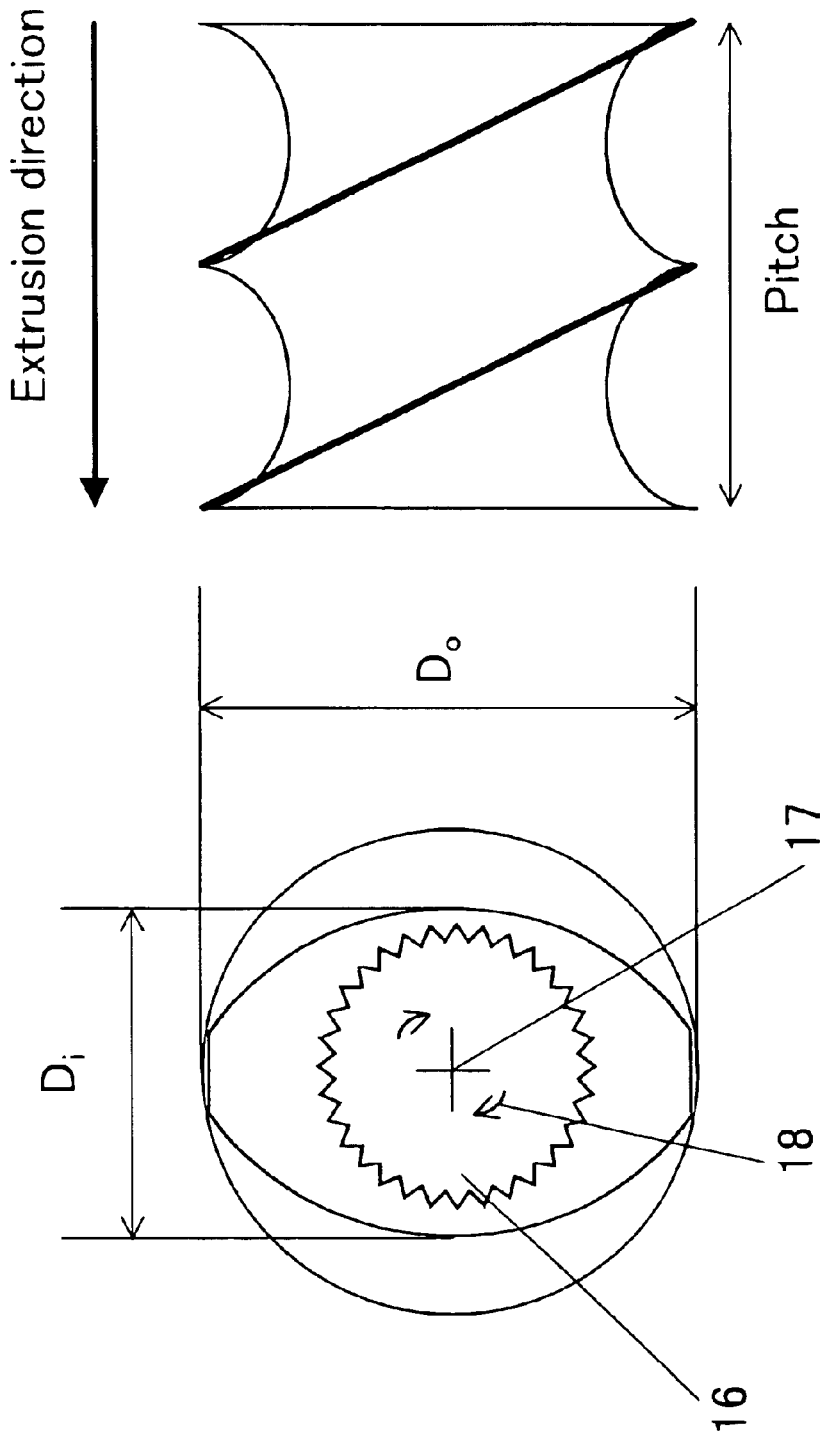

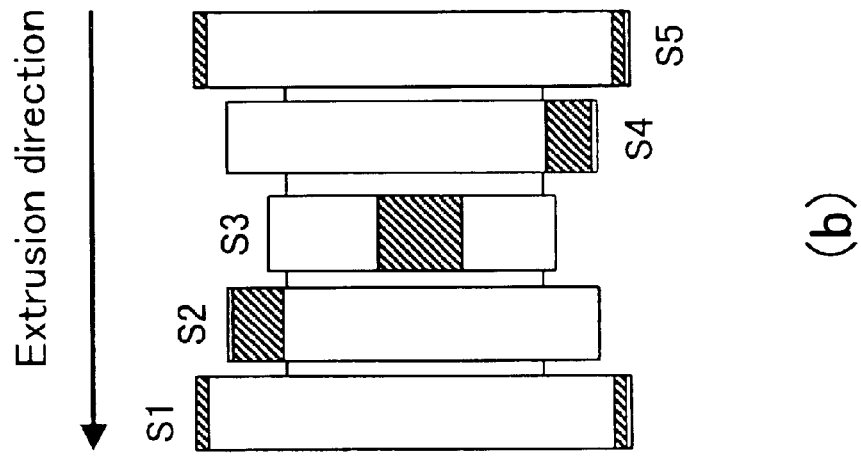
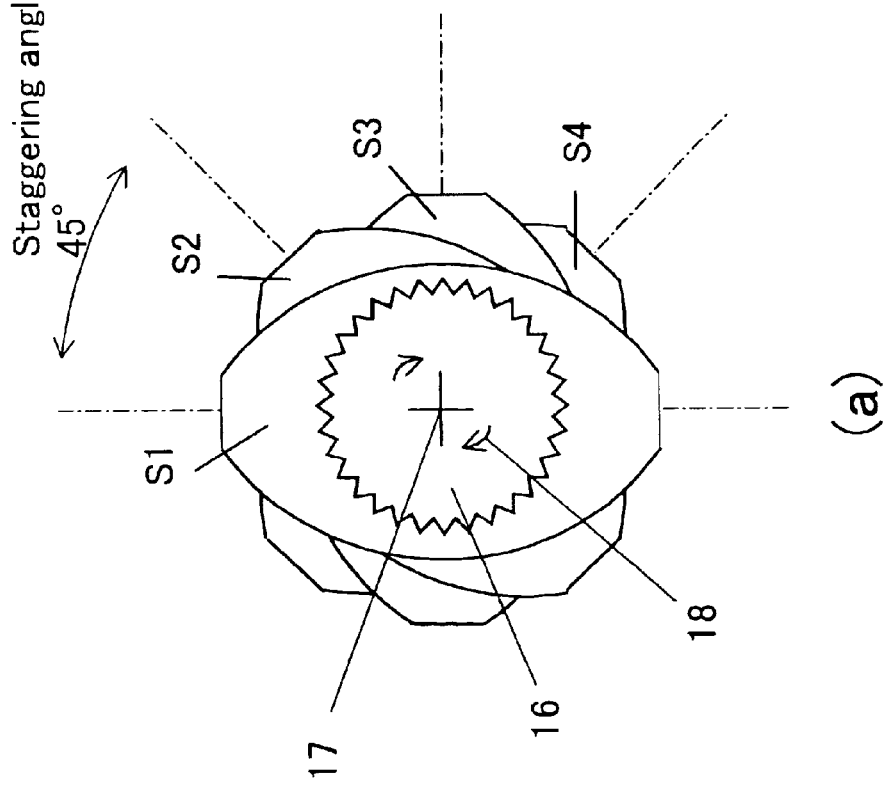

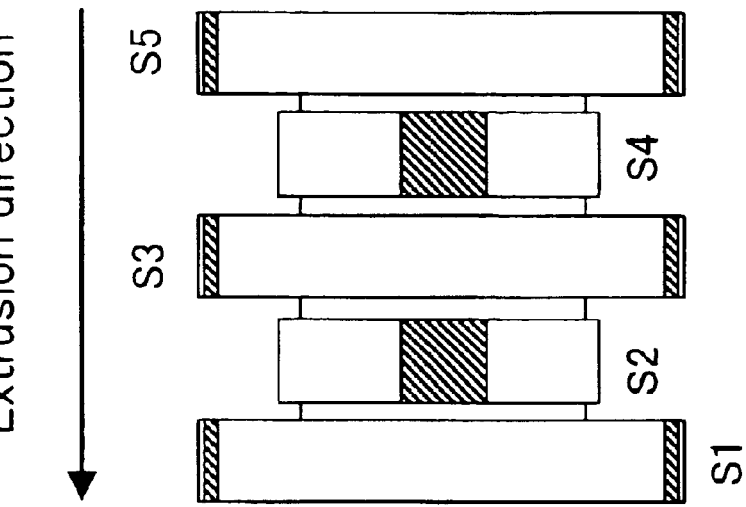
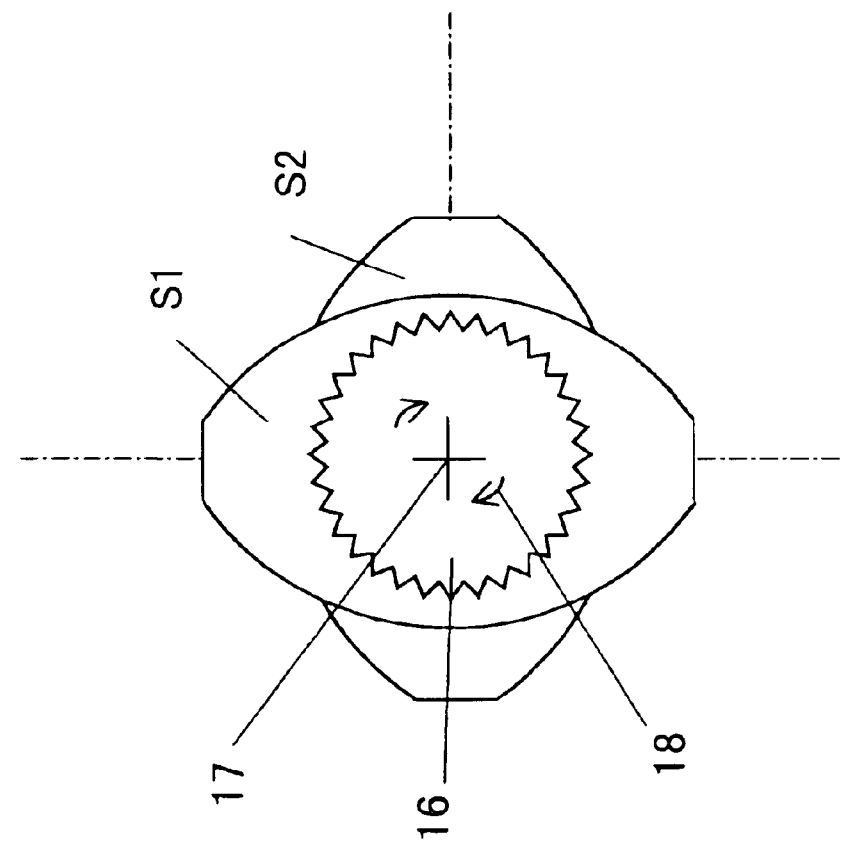

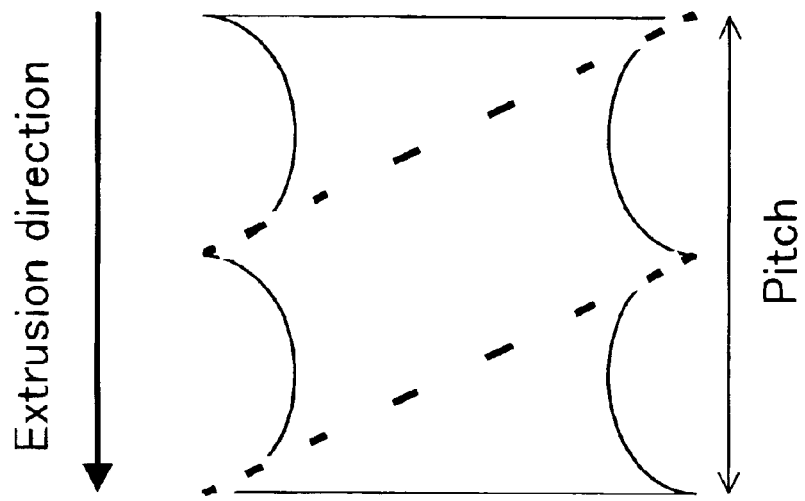
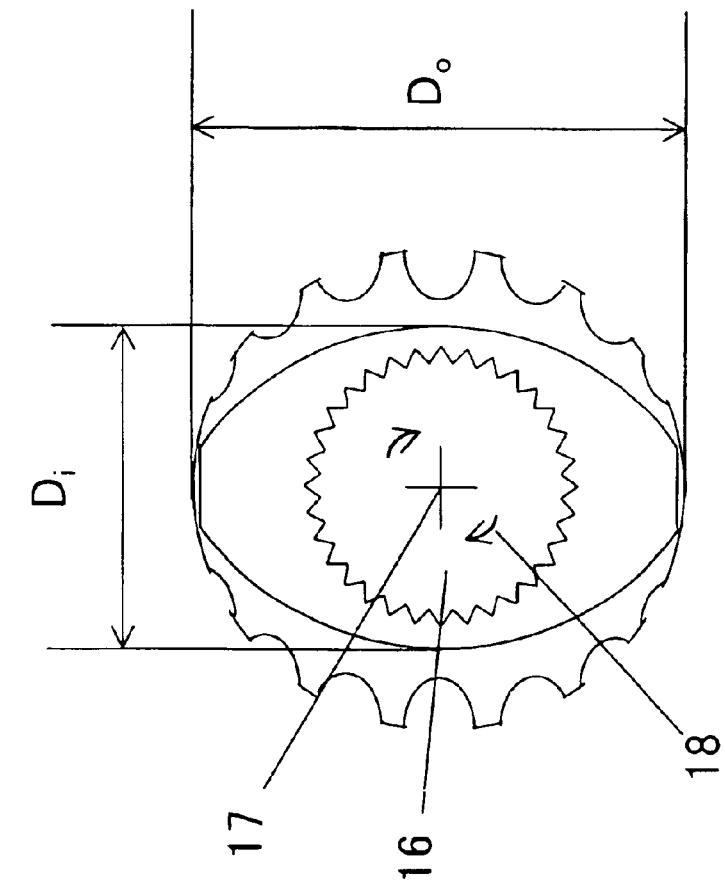

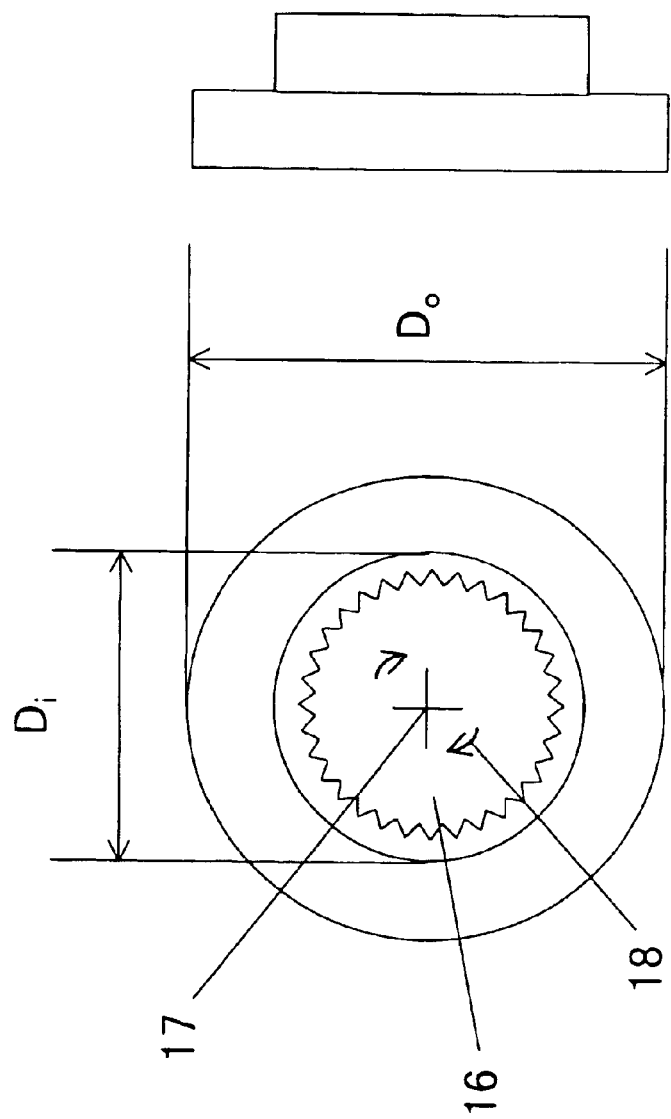

METHOD FOR PRODUCING A FLAME RETARDANT POLYCARBONATE RESIN COMPOSITION

BACKGROUND OF THE INVENTION

1. Field of the Invention

The present invention relates to a method for producing a flame retardant polycarbonate resin composition. More particularly, the present invention is concerned with a method for producing a flame retardant polycarbonate resin composition by using a screw extruder, which comprises extruding a resin component (mainly comprising a polycarbonate) and an organic phosphorus compound having an acid value of not more than 0.1 mg KOH/g while kneading, wherein the temperature of the resin component in the extruder is not higher than 300° C., and the residence time of the resin component in the extruder is not more than 40 seconds. By the method of the present invention, it has become possible to produce a flame retardant polycarbonate resin composition containing an organic phosphorus compound as a flame retardant, in which not only a lowering of the mechanical properties but also a deterioration of the color can be greatly suppressed even under high temperature and high humidity conditions.

2. Prior Art

A resin composition comprising a polycarbonate (PC), an organic phosphorus compound-containing flame retardant and optionally an ABS (acrylonitrile-butadiene-styrene) resin is a flame retardant resin composition which is free from a chlorine/iodide flame retardant. Such a flame retardant resin composition is excellent in various properties, such as melt fluidity, rigidity, impact resistance, heat resistance and resistance to discoloration under light, and hence, it has been widely used as a material for housings in electric appliances and office automation machines, such as computers, printers, word processors and copying machines.

However, in the case of a flame retardant polycarbonate resin composition containing an organic phosphorus compound-containing flame retardant (hereinafter, frequently referred to simply as a "flame retardant polycarbonate resin composition"), the organic phosphorus compound present in the resin composition is likely to suffer heat decomposition or hydrolysis to thereby lower the properties of the resin composition. Particularly, such a resin composition has a problem in that the mechanical properties (such as impact resistance and break strength) and color of the resin composition are markedly lowered under high temperature and high humidity conditions. When it is intended to use the flame retardant polycarbonate resin composition in fields where the resin composition is required to retain the desired properties for a long time, the above-mentioned problem reduces the reliability of the flame retardant polycarbonate resin composition. Therefore, there has been a strong demand to improve the flame retardant polycarbonate resin composition with respect to the resistance thereof to high temperature and high humidity conditions.

Heretofore, various proposals have been made to solve the above-mentioned problem. For example, Unexamined Japanese Patent Application Laid-Open Specification No. 9-188808 (corresponding to EP 711 851) discloses a flame retardant polycarbonate resin composition containing a rubber-grafted copolymer, in which it is attempted to suppress a lowering of the Izod impact strength under high temperature and high humidity conditions by increasing the content of the rubber-grafted copolymer in the resin composition. However, by the technique of this patent document, it is impossible to suppress satisfactorily a lowering of the Izod impact strength of the resin composition under high temperature and high humidity conditions. Further, the technique of this patent document has a defect in that, in accordance with the increase in the rubber content of the resin composition, the properties (such as rigidity, melt fluidity and flame retardancy) of the resin composition are lowered. In Unexamined Japanese Patent Application Laid-Open Specification No. 11-310695 (corresponding to EP 936 243), an organic phosphorus compound having a low acid value of less than 1 mg KOH/g is used as a flame retardant for a polycarbonate resin. However, even when such an organic phosphorus compound having a low acid value is used, it is difficult to obtain a flame retardant polycarbonate resin composition which has a satisfactorily improved resistance to high temperatures and high humidity conditions. In Unexamined Japanese Patent Application Laid-Open Specification No. 11-189714 (corresponding to EP 909 790), it is attempted to obtain a flame retardant polycarbonate resin composition having an improved resistance to high temperatures and high humidity by incorporating into the resin composition an acid scavenger for removing acidic substances formed by the decomposition of a phosphorus compound. However, in the technique of this patent document, it is difficult to control appropriately the amount of the acid scavenger incorporated into the resin composition. Even if the amount of the acid scavenger incorporated into the resin composition is only slightly larger than the appropriate amount, disadvantages are likely to occur such that the melt fluidity of the resin composition is lowered, and that the impact resistance of the resin composition is lowered.

Further, Unexamined Japanese Patent Application Laid-Open specification Nos. 11-246721, 2000-109670 (each corresponding to U.S. Pat. No. 6,177,492) and 2000-95935 disclose a flame retardant polycarbonate resin composition obtained by blending a polycarbonate resin with a styrene polymer resin, a polyphenylene ether resin, a saturated polyester resin, and an organic phosphorus compound-containing flame retardant. However, the resin composition disclosed in these patent documents is unsatisfactory with respect to the resistance to discoloration under light and the impact resistance. Each of these patent documents describes that the kneading time for producing the resin composition is preferably 20 minutes or less. For example, in the working examples of the above-mentioned Unexamined Japanese Patent Application Laid-Open specification Nos. 11-246721, the kneading is conducted for 100 seconds. Each of the above patent documents has no description regarding the resistance of the resin composition to high temperature and high humidity conditions. Needless to say, each of the above patent document has no teaching or suggestion about a method for improving a flame retardant polycarbonate resin composition with respect to the resistance to high temperatures and high humidity.

Thus, although it has been strongly desired to improve a flame retardant polycarbonate resin composition containing an organic phosphorus compound-containing flame retardant with respect to the resistance to high temperature and high humidity conditions, a flame retardant polycarbonate resin composition having satisfactorily improved resistance to high temperature and high humidity conditions has not been realized.

SUMMARY OF THE INVENTION

In this situation, the present inventors have made extensive and intensive studies toward developing a method for producing a flame retardant polycarbonate resin composition containing an organic phosphorus compound as a flame retardant, in which not only a reduction in the mechanical properties but also a deterioration of the color can be greatly suppressed even under high temperature and high humidity conditions. As a result, it has unexpectedly been found that, by a method comprising extruding, in a screw extruder, a resin component (mainly comprising a polycarbonate) and an organic phosphorus compound having an acid value of not more than 0.1 mg KOH/g while kneading, wherein the temperature of the resin component in the extruder is not higher than 300° C., and the residence time of the resin component in the extruder is not more than 40 seconds, it becomes possible to produce efficiently the above-mentioned excellent flame retardant polycarbonate resin composition. The present invention has been completed, based on this novel finding.

Accordingly, it is a primary object of the present invention to provide a method for efficiently producing a flame retardant polycarbonate resin composition containing an organic phosphorus compound as a flame retardant, in which not only a lowering of the mechanical properties but also a deterioration of the color can be greatly suppressed even under high temperature and high humidity conditions.

The foregoing and other objects, features and advantages of the present invention will be apparent from the following detailed description and appended claims taken in connection with the accompanying drawings.

BRIEF DESCRIPTION OF THE DRAWINGS

In the drawings:

FIGS. 4(a) to 11(b) are explanatory diagrams showing the examples of screw elements of an extruder, which are used in the method of the present invention.

Figure 1:
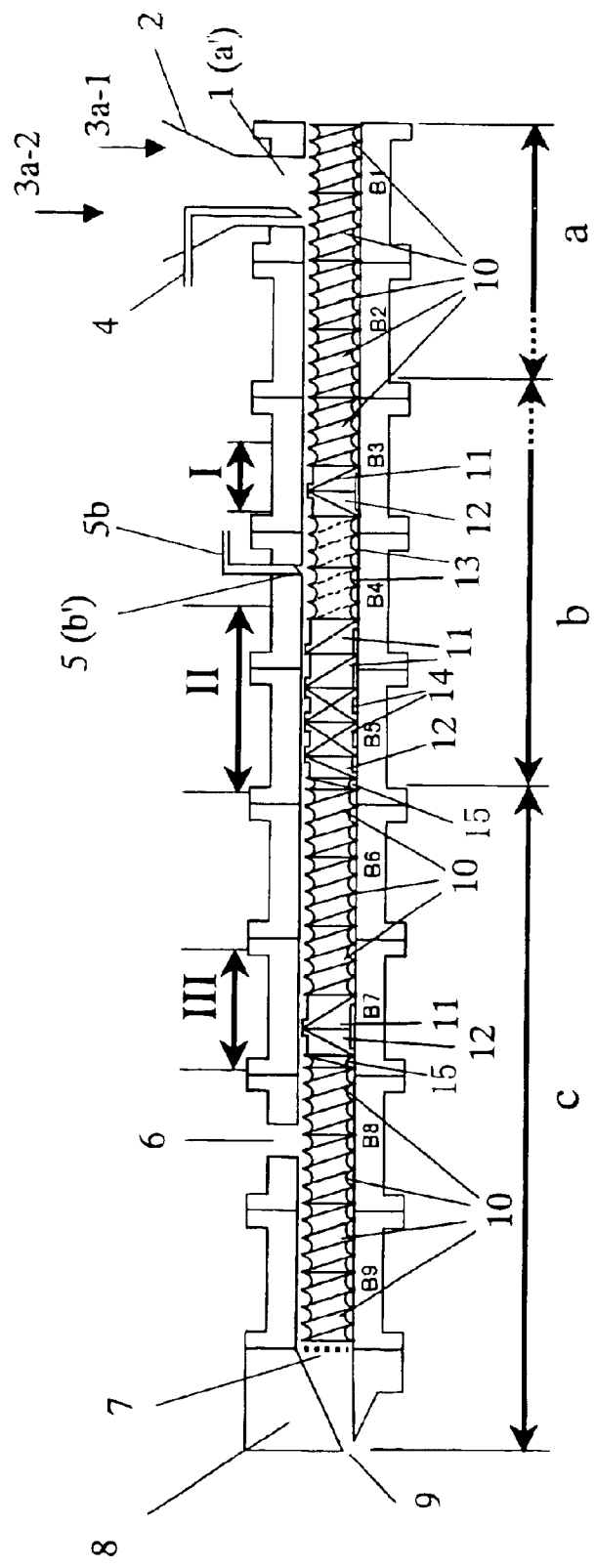
FIG. 1 is an explanatory diagrammatic side view showing the internal structure of one form of an extruder used in the method of the present invention.

DESCRIPTION OF THE REFERENCE NUMERALS a Zone (a) in which the resin component is maintained in a non-molten state
b Zone (b) in which the resin component is maintained in a partially molten state
c Zone (c) in which the resin component is maintained in a completely molten state
I Zone I for preventing the organic phosphorus compound fed to zone (b) from flowing back to zone (a)
II Zone II for kneading the resin component, the organic phosphorus compound and the aqueous dispersion of a fluoropolymer
III Zone III for preventing the molten resin from flowing out of the extruder through the vent (such a phenomena is hereinafter, frequently referred to as the "venting-up of the resin")
B1 to B10 1st to 10th cylinder blocks
1(a') Inlet (a') for the resin component and the aqueous dispersion of a fluoropolymer
2 Hopper
3a-1 Polycarbonate or a raw material mixture containing a polycarbonate
3a-2, 3a-3 and 3a-4 Resin (other than a polycarbonate) or additive
4 Nozzle for feeding the aqueous dispersion of a fluoropolymer
5(b') Inlet (b') for feeding the organic phosphorus compound
5b Nozzle for feeding the organic phosphorus compound
6 Vent
7 Screen
8 Die adapter block
9 Extrusion outlet for the flame retardant polycarbonate resin composition
10 Flighted screw element having positive conveying action
11 Kneading element having positive conveying action
12 Kneading element having counter-conveying action
13 Screw mixing element having positive conveying action
14 Kneading element having neutral conveying action
15 Flighted screw element having counter-conveying action
16 Rotation shaft of a screw
17 Axis of rotation shaft 16
18 Rotation direction of the rotation shaft as viewed from the extrusion outlet of the extruder
S1 to S5 Quasi-elliptical discs forming the kneading elements of FIGS. 6 to 8

DETAILED DESCRIPTION OF THE INVENTION

In one aspect of the present invention, there is provided a method for producing a flame retardant polycarbonate resin composition by kneading together:

a resin component mainly comprising a polycarbonate, and an organic phosphorus compound, in a screw extruder comprising one or more supply inlets for said resin component and said organic phosphorus compound, and an extrusion outlet for a flame retardant resin composition obtained by said kneading, characterized in that the method comprises:

continuously feeding said resin component to said extruder through the supply inlet, while continuously feeding said organic phosphorus compound to said extruder through the same supply inlet as used for feeding said resin component or through a supply inlet other than used for feeding said resin component, wherein said organic phosphorus compound has an acid value of not more than 0.1 mg KOH/g, said resin component and said organic phosphorus compound being extruded toward said extrusion outlet under kneading, wherein the temperature of said resin component in the extruder is not higher than 300° C., and the residence time of said resin component in the extruder is not more than 40 seconds, to thereby produce a flame retardant polycarbonate resin composition, while withdrawing said flame retardant polycarbonate resin composition through said extrusion outlet.

For easy understanding of the present invention, the essential features and various embodiments of the present invention are enumerated below.

1. In a method for producing a flame retardant polycarbonate resin composition by kneading together:

a resin component mainly comprising a polycarbonate, and an organic phosphorus compound, in a screw extruder comprising one or more supply inlets for the resin component and the organic phosphorus compound, and an extrusion outlet for a flame retardant resin composition obtained by the kneading, the improvement wherein the method comprises:

continuously feeding the resin component to the extruder through the supply inlet, while continuously feeding the organic phosphorus compound to the extruder through the same supply inlet as used for feeding the resin component or through a supply inlet other than used for feeding the resin component, wherein the organic phosphorus compound has an acid value of not more than 0.1 mg KOH/g, the resin component and the organic phosphorus compound being extruded toward the extrusion outlet under kneading, wherein the temperature of the resin component in the extruder is not higher than 300° C., and the residence time of the resin component in the extruder is not more than 40 seconds, to thereby produce a flame retardant polycarbonate resin composition, while withdrawing the flame retardant polycarbonate resin composition through the extrusion outlet.

2. The method according to item 1 above, wherein the residence time of the resin component in the extruder is not more than 30 seconds.

3. The method according to item 1 above, wherein the extruder is a twin-screw extruder.

4. The method according to item 1 above, wherein the resin component fed to the extruder is in the solid state, and the extruder comprises a zone (a), a zone (b) and a zone (c) which are arranged in this order as viewed in an extrusion direction of the extruder, zone (c) communicating directly with the extrusion outlet for the flame retardant resin composition, and wherein the resin component present in zone (a) is maintained in a non-molten state, and the resin component present in zone (b) is maintained in a partially molten state, and the resin component present in zone (c) is maintained in a completely molten state.

5. The method according to item 4 above, wherein the extruder has a supply inlet (a') for the resin component and a supply inlet (b') for the organic phosphorus compound, supply inlet (a') communicating directly with zone (a), supply inlet (b') communicating directly with zone (b), and wherein the resin component is fed to zone (a) through supply inlet (a'), and the organic phosphorus compound is fed to zone (b) through supply inlet (b'), wherein the feeding rate (kg/hr) of the organic phosphorus compound is in the range of from 1 to 30%, based on the feeding rate (kg/hr) of the resin component.

6. The method according to item 5 above, wherein the resin filling ratio in the extruder is increased at zone I for preventing the organic phosphorus compound from flowing back to zone (a), the resin filling ratio being defined as a volume ratio of the resin component to an inner space of the extruder, zone I being positioned in zone (b) and positioned upstream of the feeding point of the organic phosphorus compound as viewed in an extrusion direction of the extruder, and wherein the kneading of the resin component and the organic phosphorus compound is performed mainly in region II downstream of the feeding point of the organic phosphorus compound as viewed in an extrusion direction of the extruder.

7. The method according to item 1 above, wherein the resin component comprises a polycarbonate and a rubber-modified styrene resin.

8. The method according to item 1 above, wherein the organic phosphorus compound is at least one compound selected from the group consisting of compounds represented by the following formula (I):

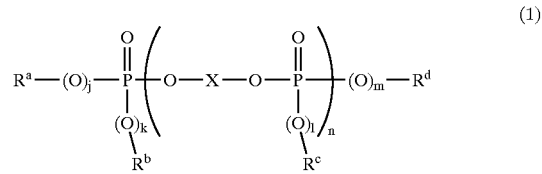

(1)

wherein:
X represents

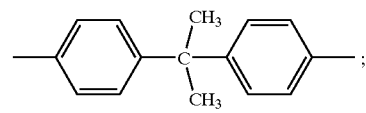

each of $R^a$, $R^b$, $R^c$ and $R^d$ independently represents a $C_6$–$C_{12}$ aryl group;
n represents an integer of 1 to 5; and
each of j, k, l and m independently represents 0 or 1.

9. The method according to item 1 above, wherein the organic phosphorus compound contains metal atoms in an amount of not more than 30 ppm and chlorine atoms in an amount of not more than 20 ppm.

10. The method according to item 1 above, wherein a fluoropolymer is further fed to the extruder.

11. The method according to item 4 above, wherein the extruder has one or more inlets (a') communicating directly with zone (a), and wherein the resin component is continuously fed to zone (a) through supply inlet (a'), and an aqueous dispersion of a fluoropolymer is continuously fed to zone (a) separately from the resin component through the same supply inlet (a') as used for feeding the resin component or through a supply inlet (a') other than used for feeding the resin component, wherein the feeding rate (kg/hr) of the aqueous dispersion of the fluoropolymer is in the range of from 0.01 to 10%, based on the feeding rate (kg/hr) of the resin component.

12. The method according to item 11 above, wherein the aqueous dispersion of a fluoropolymer fed to zone (a) of the extruder has a temperature of from 5 to 30° C.

13. A shaped article obtained by molding the flame retardant polycarbonate resin composition produced by the method of any one of items 1 to 12 above.

The present invention will now be described in detail.

In the present invention, as the polycarbonate used in the resin component, it is preferred to use an aromatic polycarbonate. The aromatic polycarbonate which is preferably used in the present invention comprises recurring units each independently represented by the following formula (2):

(2)

wherein Ar represents a divalent aromatic group having 5 to 200 carbon atoms.

Examples of divalent aromatic groups Ar include a phenylene group, a naphthylene group, a biphenylene group and a pyridylene group, which are unsubstituted or substituted with at least one substituent as described below, and include a group represented by the following formula (3):

(3)

wherein each of Ar¹ and Ar² independently represents an arylene group, such as a phenylene group, a naphthylene group, a biphenylene group or a pyridylene group, which is unsubstituted or substituted with at least one substituent as described below, and Y represents an unsubstituted or substituted alkylene group represented by any one of the following formulae (4):

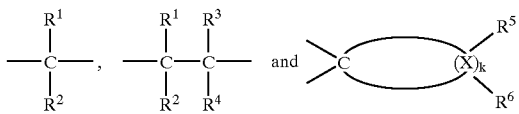
(4)

wherein each of $R^1$, $R^2$, $R^3$ and $R^4$ independently represents a hydrogen atom, a lower alkyl group having 1 to 6 carbon atoms, a cycloalkyl group having 5 to 10 carbon atoms, an aryl group having 6 to 30 carbon atoms or an aralkyl group having 7 to 31 carbon atoms, which may be substituted with a halogen atom or an alkoxy group having 1 to 10 carbon atoms; k represents an integer of from 3 to 11; each X represents a carbon atom and has $R^5$ and $R^6$ bonded thereto;

each $R^5$ independently represents a hydrogen atom, a lower alkyl group having 1 to 6 carbon atoms or an aryl group having 6 to 30 carbon atoms, and each $R^6$ independently represents a hydrogen atom, a lower alkyl group having 1 to 6 carbon atoms or an aryl group having 6 to 30 carbon atoms; and wherein each of $R^1$, $R^2$, $R^3$, $R^4$, $R^5$ and $R^6$ may be substituted with a halogen atom and/or an alkoxy group having 1 to 10 carbon atoms.

The aromatic polycarbonate used in the present invention may contain, as a comonomer unit, a divalent aromatic group represented by the following formula (5):

(5)

wherein Ar¹ and Ar² are as defined for formula (3) above; and Z represents a single bond, or a divalent group, such as —O—, —CO—, —S—, —SO₂—, —CO₂—, or —CON(R¹)—, wherein $R^1$ is as defined for formula (4) above.

Specific examples of divalent aromatic groups represented by Ar of formula (2) and by formula (5) usable in the present invention include groups respectively represented by the following formulae:

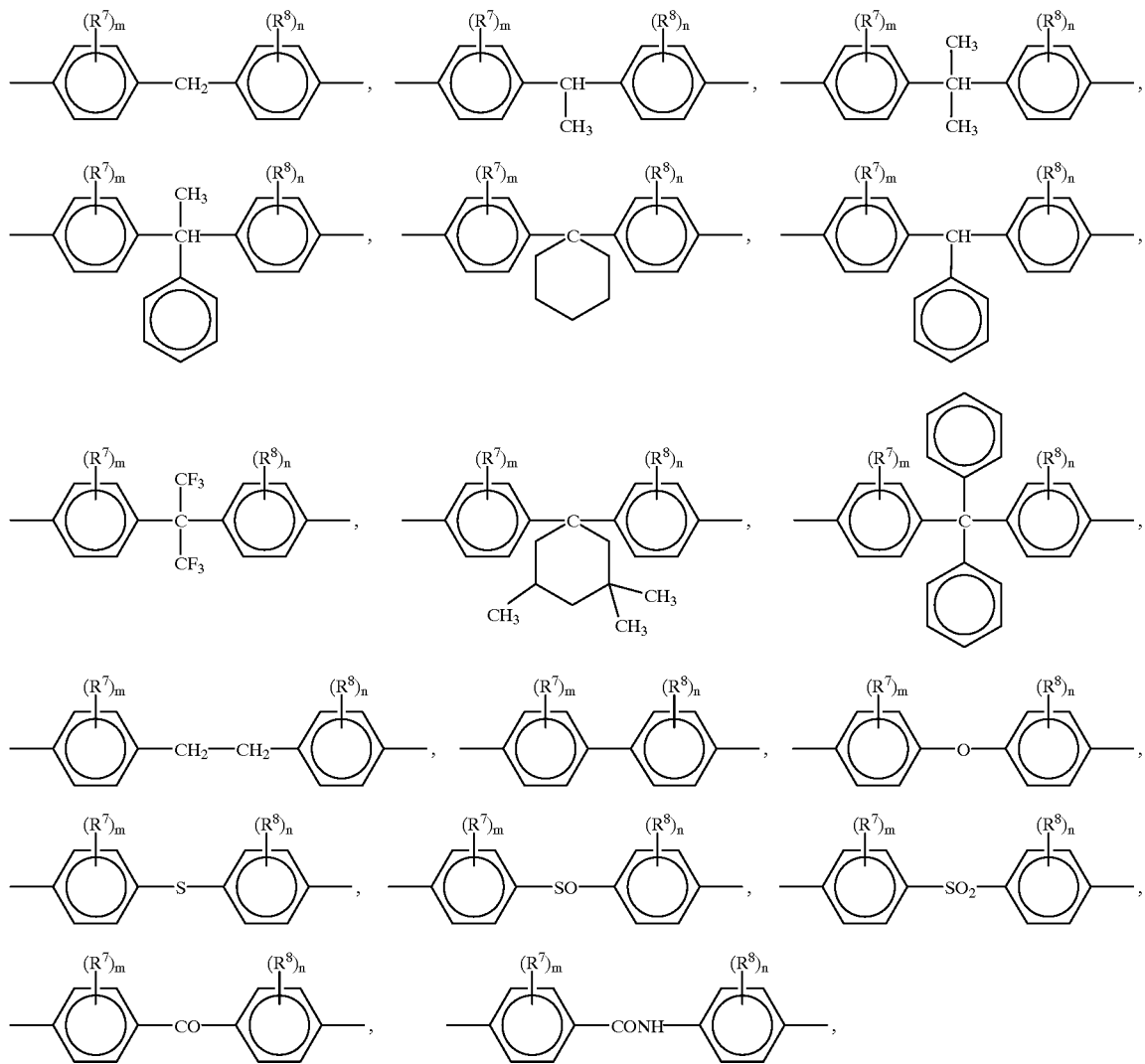

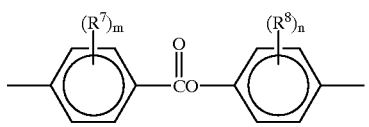
and
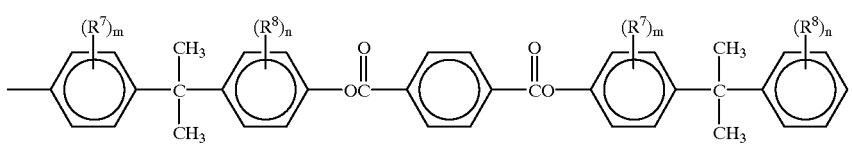

wherein each of $R^7$ and $R^8$ independently represents a hydrogen atom, a halogen atom, an alkyl group having 1 to 10 carbon atoms, an alkoxy group having 1 to 10 carbon atoms, a cycloalkyl group having 5 to 10 carbon atoms, or an aryl group having 6 to 30 carbon atoms; each of m and n independently represents an integer of from 1 to 4, with the proviso that when m is an integer of from 2 to 4, the $R^7$'s are the same or different, and when n is an integer of from 2 to 4, the $R^8$'s are the same or different.

A preferred example of divalent aromatic groups is a group represented by the following formula (6):

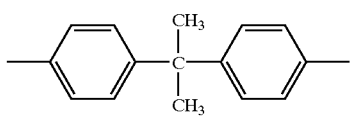 (6)

It is especially preferred that the polycarbonate contains 85 mole % or more, based on all of the monomer units in the polycarbonate, of recurring units each having an Ar represented by the above formula (6).

The polycarbonate used in the present invention may have a branched structure, wherein a tri- or more valent aromatic group having 6 to 300 carbon atoms forms a branching point of the branched structure.

With respect to the molecular structures of the terminal groups of the polycarbonate, there is no particular limitation. The terminal groups of the polycarbonate may be at least one member selected from the group consisting of a phenolic group, an aryl carbonate group and an alkyl carbonate group. A terminal aryl carbonate group is represented by the following formula (7):

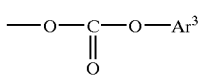 (7)

wherein $Ar^3$ represents a monovalent aromatic group having 6 to 30 carbon atoms, wherein the aromatic ring of $Ar^3$ may be unsubstituted or substituted.

Specific examples of terminal aryl carbonate groups include groups respectively represented by the following formulae:

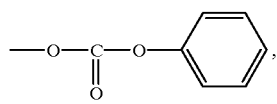

-continued

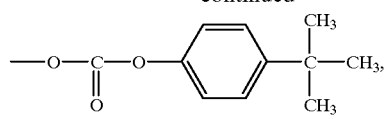

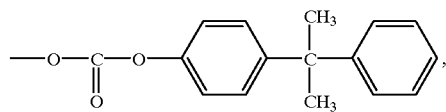

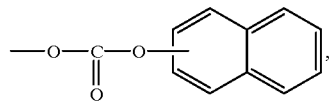

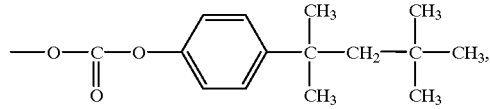

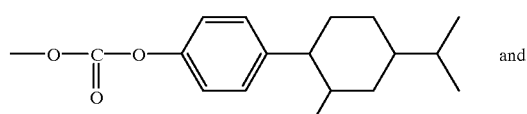
and

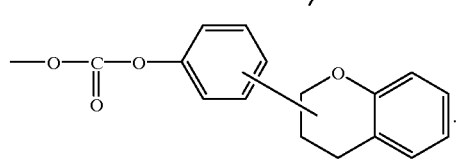

The terminal alkyl carbonate group is represented by the following formula (8):

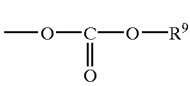 (8)

wherein $R^9$ represents a straight chain or branched alkyl group having 1 to 20 carbon atoms.

Specific examples of terminal alkyl carbonate groups include groups respectively represented by the following formulae:

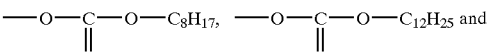
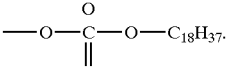

Among these terminal groups, preferred terminal groups are a phenolic group, a phenyl carbonate group, a p-t-butylphenyl carbonate group and a p-cumylphenyl carbonate group.

With respect to the ratio of the terminal phenolic groups to the other terminal groups, there is no particular limitation. However, from the viewpoint of improving color and mechanical properties of the polycarbonate resin composition, it is preferred that the amount of the terminal phenolic groups is 20% or more, more advantageously from 20 to 80%, based on the number of all terminal groups. When the amount of the terminal phenolic groups is more than 80%, the melt stability of the aromatic polycarbonate tends to slightly decrease.

As methods for determining the amount of the terminal phenolic groups, there are generally known a method using NMR (NMR method), a method using titanium (titanium method) and a method using UV or IR (UV method or IR method).

With respect to the aromatic polycarbonate used in the present invention, it is generally preferred that the weight average molecular weight (Mw) of the aromatic polycarbonate is from 5,000 to 50,000, more preferably from 10,000 to 40,000, still more preferably from 15,000 to 30,000, and most preferably from 18,000 to 25,000. When the Mw of the aromatic polycarbonate is less than 5,000, the impact resistance of the resin composition tends to be unsatisfactory, and when the Mw of the polycarbonate is more than 50,000, the melt fluidity of the resin composition tends to be unsatisfactory.

In the present invention, the weight average molecular weight (Mw) of the polycarbonate is measured by gel permeation chromatography (GPC) under the following conditions. A calibration curve is obtained with respect to standard monodisperse polystyrenes using a polystyrene gel column and tetrahydrofuran as a solvent. The obtained calibration curve is modified by a calculation using the following formula:

$$M_{PC} = 0.3591 \, M_{PS}^{1.0388}$$

wherein $M_{PC}$ represents the molecular weight of a polycarbonate and $M_{PS}$ represents the molecular weight of a polystyrene, thereby obtaining a modified calibration curve for a polycarbonate. The weight average molecular weight of a polycarbonate is measured by GPC using the obtained modified calibration curve.

The polyearbonate used in the present invention can be produced by a conventional method. Examples of conventional methods include an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent; a transesterification process (melt process) in which an aromatic dihydroxy compound and a carbonic diester (e.g., a diphenyl carbonate) are reacted with each other; a solid state polymerization process in which a carbonate prepolymer obtained by the phosgene process or by the melt process is crystallized and subjected to a solid state polymerization (Unexamined Japanese Patent Application Laid-Open Specification No. 1-158033 (corresponding to U.S. Pat. No. 4,948,871)); a method disclosed in Unexamined Japanese Patent Application Laid-Open Specification No. 1-271426; and a method disclosed in Unexamined Japanese Patent Application Laid-Open Specification No. 3-68627 (corresponding to U.S. Pat. No. 5,204,377).

As a polycarbonate resin preferably used in the present invention, there can be mentioned a polycarbonate resin produced from a divalent phenol (aromatic dihydroxy compound) and a carbonic diester by a transesterification process. Such a polycarbonate resin advantageously contains substantially no chlorine atoms.

In the present invention, two or more different polycarbonates having different structures and/or molecular weights can be used in combination.

The resin component used in the method of the present invention may be either composed only of a polycarbonate, or a mixture composed mainly of a polycarbonate and further containing a thermoplastic resin other than a polycarbonate.

Examples of thermoplastic resins (other than a polycarbonate) which can be used in the resin component include rubber-modified resins, such as an acrylonitrile-styrene copolymer (AS) resin, a methyl methacrylate-styrene copolymer (MS) resin, an acrylonitrile-butadiene-styrene copolymer (ABS) resin, an acrylonitrile-butyl acrylate-styrene copolymer (AAS), a methyl methacrylate-butadiene-styrene (MBS) copolymer resin and a HIPS (high impact polystyrene) resin, a polyphenylene ether resin, a polyamide resin, a polyester resin, a polyolefin resin, a polyacetal resin, a polymethyl methacrylate resin, a polyvinyl chloride resin, graft copolymer rubbers which can be used as an impact modifier, such as a core-shell rubber, and various elastomers.

When a resin component comprising a polycarbonate and a thermopolastic resin other than a polycarbonate is used in the method of the present invention, the thermoplastic resin other than a polycarbonate is preferably used in an amount of from 50 to 0.1% by weight, more preferably 40 to 5% by weight, still more preferably 30 to 10% by weight, based on the weight of the resin component.

In the present invention, it is especially preferred that the resin component comprises a polycarbonate and a rubber-modified resin.

The "rubber-modified resin" means a resin comprising a rubbery polymer and at least one vinyl compound.

In the present invention, a rubbery polymer having a glass transition temperature of 0° C. or less can be used to obtain the above-mentioned rubber-modified resin. Specific examples of rubbery polymers include diene rubbers, such as polybutadiene, a styrene-butadiene copolymer rubber and an acrylonitrile-butadiene copolymer rubber; acrylic rubbers, such as a poly(butyl acrylate); polyisoprene; polychloroprene; ethylene-propylene rubbers; ethylene-propylene-diene ternary copolymer rubbers; block copolymers, such as a styrene-butadiene block copolymer and a styrene-isoprene block copolymer; and hydrogenation products of the above-mentioned polymers. Among these polymers, preferred are polybutadiene, a styrene-butadiene copolymer rubber, an acrylonitrile-butadiene copolymer rubber and poly(butyl acrylate).

With respect to the above-mentioned rubber-modified resin, the content of the rubbery polymer is appropriately selected depending on the desired mechanical strength, rigidity and moldability of the resin composition, and is generally in the range of from 1 to 95% by weight, preferably from 5 to 45% by weight, more preferably from 10 to 40% by weight.

Examples of vinyl compounds used to obtain the rubber-modified polymer include aromatic vinyl compounds, such as styrene, α-methylstyrene, paramethylstyrene; alkyl (meth)acrylates, such as methyl methacrylate, methyl acrylate, butyl acrylate and ethyl acrylate; (meth)acrylates, such as acrylic acid and methacrylic acid; vinyl cyanide monomers, such as acrylonitrile and methacrylonitrile; α,β-unsaturated carboxylic acids, such as maleic anhydride; maleimide compounds, such as N-phenylmaleimide, N-methylmaleimide and N-cyclohexylmaleimide; and glycidyl group-containing monomers, such as glycidyl methacrylate. Of these, preferred are aromatic vinyl compounds, alkyl (meth)acrylates, vinyl cyanide monomers and maleimide compounds, and more preferred are styrene, acrylonitrile, N-phenylmaleimide and butyl acrylate. These monomers can be used individually or in combination. It is preferred to use a combination of an aromatic vinyl compound and a vinyl compound other than an aromatic vinyl compound. In this case, the ratio of the aromatic vinyl compound and the vinyl compound other than an aromatic vinyl compound may be appropriately selected, and the amount of the vinyl compound other than an aromatic vinyl compound is preferably within the range of from 5 to 80% by weight, based on the total weight of the vinyl aromatic compound and the vinyl compound other than an aromatic vinyl compound.

With respect to the method for producing the rubber-modified resin, there is no particular limitation, and the rubber-modified resin can be produced by conventional polymerization methods, such as a bulk polymerization method, a solution polymerization method, a suspension polymerization method and an emulsion polymerization method.

In the method of the present invention, when the resin component comprising a polycarbonate and a rubber-modified resin is used, the ratio of the polycarbonate to the rubber-modified resin is selected depending on the desired mechanical strength, moldability and heat resistance of the resin composition, and is preferably within the range of from 50/50 to 95/5, more preferably from 60/40 to 90/10.

In the method of the present invention, the resin component fed to the extruder may be in molten state; however, it is preferred that the resin component is in the solid state, i.e., in the form of pellets, a powder or a mixture thereof.

When the resin component comprising a polycarbonate and the other thermoplastic resin is fed to the extruder, the polycarbonate (which is in the form of pellets, a powder or a mixture thereof) and the other thermoplastic resin (which is in the form of pellets, a powder or a mixture thereof) may be mixed with each other prior to feeding thereof to the extruder, or may be separately fed to the extruder. Alternatively, a molten resin mixture obtained by melt-mixing the polycarbonate and the other thermoplastic resin or a pelletized product thereof may be fed to the extruder.

The organic phosphorus compound used in present invention is at least one organic phosphorus compound having at least one phosphorus atom in a molecular structure thereof.

As examples of an organic phosphorus compound having one phosphorus atom (hereinafter, referred to as a "organic monophosphorus compound"), there can be mentioned triphenyl phosphate, tricresyl phosphate, cresyl phenyl phosphate, trixylenyl phosphate and xylenyl phenyl phosphate.

However, the use of the organic monophosphorus compound is disadvantageous in that, when the flame retardant polycarbonate resin composition containing such a organic monophosphorus compound is molded, the mold deposit (MD) adhering to the inner surface of a mold is likely to occur. Therefore, in the present invention, it is preferred to use a organic phosphorus compound oligomer having at least two phosphorus atoms.

As an especially preferred example of the organic phosphorus compound oligomer used in the present invention, there can be mentioned a compound selected from the group consisting of compounds individually represented by the following formula:

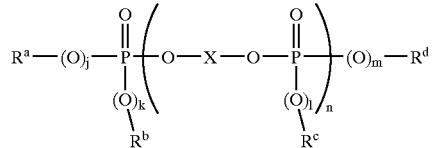

(1)

wherein:

X represents

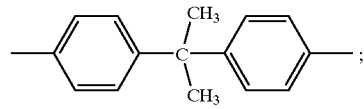

each of $R^a$, $R^b$, $R^c$ and $R^d$ independently represents a $C_6$–$C_{12}$ aryl group;

n represents an integer of 1 to 5; and each of j, k, l and m independently represents 0 or 1.

At least one hydrogen atom of each of the groups $R^a$, $R^b$, $R^c$ and $R^d$ in formula (1) above may be unsubstituted or independently replaced by a substituent. When at least one hydrogen atom is replaced by a substituent, examples of such substituents include an alkyl group, an alkoxy group, an alkylthio group, an aryl group, an aryloxy group, an arylthio group and a halogenated aryl group, each having 1 to 30 carbon atoms; a halogen atom; and a group obtained by combining the above-mentioned substituents (for example, an arylalkoxyalkyl group) and a group obtained by combining the above-mentioned substituents through an oxygen atom, a sulfur atom, a nitrogen atom and the like (for example, an arylsulfonylaryl group).

Examples of aryl groups $R^a$, $R^b$, $R^c$ and $R^d$ which are especially preferred in the present invention include a phenyl group, a cresyl group, a xylyl group, a propylphenyl group and a butylphenyl group. If each of the groups $R^a$, $R^b$, $R^c$ and $R^d$ in the compound represented by formula (1) is an alkyl group or an cycloalkyl group, the thermal stability of the compound would generally be unsatisfactory and such a compound is likely to be decomposed during melt kneading.

As mentioned above, the X group in the above-mentioned formula (1) is a diphenyloldimethylmethane group. In most of the oligomeric phosphoric esters conventionally used in the art, the group corresponding to the X group in the above-mentioned formula is a resorcinol group or a hydroquinone group. Contrary to such an oligomeric phosphoric ester, the compound represented by formula (1) (wherein X is a diphenyloldimethylmethane group), has improved hydrolysis resistance and thermal stability. Therefore, when a resin composition of the present invention is produced using such an organic phosphorous compound, a lowering of mechanical properties (especially the lowering of the mechanical properties under high temperature and high humidity conditions) of the produced resin composition is greatly suppressed. By virtue of such advantageous properties, the reliability of the resin composition becomes remarkably enhanced. Furthermore, by using the organic phosphorus compound represented by the above-mentioned formula (1), it becomes possible to reduce the amount of the mold deposit (MD) adhering to the inner surface of a mold during the molding of the resin composition to a remarkably low level, as compared to the case where a conventional oligomeric phosphoric ester is used.

The organic phosphorus compound oligomer represented by formula (1) is frequently a mixture of a plurality of organic phosphorus compound oligomers having different n values in formula (1) (wherein n is a natural number). In the present invention, it is preferred that the weight average polymerization degree (N) of the plurality of organic phosphorus compound oligomers is in the range of from 1 to less than 1.2, wherein the polymerization degree of the organic phosphorus compound oligomer represented by formula (1) wherein n=1 is defined as 1. The weight average polymerization degree N is determined as follows. First, respective weight fractions ($A_n$) of component compounds having different n values are determined by gel permeation chromatography or liquid chromatography (for example, the weight fraction of the organic phosphorus compound oligomer having an n value of 1 is defined as $A_1$). Then, the N value is calculated as the weight average of the different n values by the following formula:

$$N=\Sigma(n \cdot A_n)/\Sigma(A_n).$$

The chromatography is conducted using a UV detector or an RI detector as a detector. When the compound represented by formula (1) above (in which n is 1 to 5) is used in the form of a mixture thereof with a compound represented by the above-mentioned formula (1) in which the n value is 0 (i.e., an organic phosphorus compound containing only one phosphorus atom in the molecule thereof), the compound having an n value of 0 is excluded from the calculation of the N value. The weight average polymerization degree N is generally in the range of from 1 to 5, preferably from 1 to 2, more preferably from 1 to 1.5, most preferably from 1 to less than 1.2. The compatibility of the compound of formula (1) with the resin component, and the melt fluidity and the flame retardancy of the final resin composition are improved as the N of the component decreases. Especially, the resin composition containing a compound having an N value of 1 exhibits an excellent balance of flame retardancy and melt fluidity. A compound represented by formula (1) which has an N value of 5 or more has a high viscosity, and when such a compound is used in the method of the present invention, the melt fluidity of the resultant resin composition tends to be lowered, especially in the region where a high shear rate is achieved. Also the flame retardancy of the resin composition tends to be lowered.

Further, with respect to the organic phosphorus compound used in the present invention, the acid value is not more than 0.1 mg KOH/g, preferably not more than 0.05 mg KOH/g, still more preferably not more than 0.02 mg KOH/g, most preferably 0.01 mg KOH/g. By the use of an organic phosphorus compound having such a low acid value as a flame retardant, it becomes possible to greatly suppress a decrease in the mechanical strength and a deterioration of the color with respect to the resin composition even under high temperature and high humidity conditions. Therefore, in the present invention, care must be taken to prevent the increase in the acid value of the organic phosphorus compound during the storage and transportation of the organic phosphorus compound. For example, the intrusion of water into the organic phosphorus compound and the unnecessary heating of the phosphorus compound should be avoided.

The organic phosphorus compound represented by formula (1) can be obtained by a method described in U.S. Pat. No. 2,520,090, Examined Japanese Patent Application Publication No. 62-25706, Unexamined Japanese Patent Laid-Open Specification No. 63-227632 and the like, i.e., a method in which phosphorus oxychloride is reacted with bisphenol A and a monohydroxy phenol in the presence of a Lewis acid catalyst, such as magnesium chloride or aluminum chloride, and the resultant crude organic phosphorus compound is purified by washing, followed by drying, to thereby obtain a final organic phosphorus compound. The thus obtained organic phosphorus compound tends to contain metal atoms, such as magnesium and aluminum which are originally contained in the catalyst, and sodium, potassium, calcium and the like which may be incorporated into the organic phosphorus compound when an aqueous solution containing ions of an alkali metal or an alkaline earth metal is used for washing a crude organic phosphorus compound). In the present invention, for obtaining a flame retardant polycarbonate resin composition, in which not only a lowering of the mechanical strength but also a deterioration of the color can be greatly suppressed even under high temperature and high humidity conditions, the amount of metal atoms present in the organic phosphorus compound is preferably not more than 30 ppm, more preferably not more than 20 ppm, still more preferably not more than 10 ppm, most preferably not more than 5 ppm.

Further, for obtaining a flame retardant polycarbonate resin composition, in which not only a lowering of the mechanical strength but also a deterioration of the color can be greatly suppressed even under high temperature and high humidity conditions, the amount of chlorine atoms in the organic phosphorus compound is preferably not more than 20 ppm, more preferably not more than 10 ppm, still more preferably not more than 5 ppm, most preferably not more than 1 ppm.

The amount of the organic phosphorus compound used in the present invention is chosen depending on the desired level of the flame retardancy of the flame retardant resin composition, but is generally within the range of from 1 to 30 parts by weight, relative to 100 parts by weight of the resin component. Accordingly, in the method of the present invention, it is preferred to continuously feed the organic phosphorus compound to the extruder at a feeding rate (kg/hr) which is 1 to 30% of the feeding rate (kg/hr) of the resin component. When the amount of the organic phosphorus compound is less than 1 part by weight, the desired level of flame retardancy is unlikely to be obtained. When the amount of the organic phosphorus compound is more than 30 parts by weight, there is a danger that the blending of the organic phosphorus compound with the resin component becomes difficult and the impact resistance and heat resistance of the resin composition become low. The amount of the organic phosphorus compound is preferably in the range of from 2 to 20 parts by weight, more preferably from 5 to 18 parts by weight.

In the method of the present invention, for preventing the dripping of flaming particles when the resin composition is on fire, it is preferred that a fluoropolymer is further fed to the extruder.

In the method of the present invention, fluoropolymers having a fibril-forming ability can be used. Such fluoropolymers may be used in various forms, such as a fine powder, an aqueous dispersion, and a powder mixture of a fluoropolymer with other resins, such as AS and PMMA (polymethyl methacrylate).

In the method of the present invention, it is preferred to use an aqueous dispersion of a fluoropolymer. Examples of fluoropolymers include tetrafluoroethylene polymers, such as polytetrafluoroethylene and a tetrafluoroethylene-propylene copolymer; and a perfluoroalkane polymer other than tetrafluoroethylene polymers. Of these, preferred are tetrafluoroethylene polymers, and especially preferred is polytetrafluoroethylene. For example, the aqueous dispersion of a fluoropolymer can be produced by a method comprising subjecting tetrafluoroethylene and a commonomer, if any, to suspension polymerization or emulsion polymerization in an aqueous medium in such a manner as described, for example, in "Fusso Jushi Hando Bukku (Fluororesin Handbook)", published in 1990 by the Nikkan Kogyo Shimbun Ltd., Japan, and condensing the resultant aqueous dispersion of fluoropolymer particles to thereby adjust the concentration of fluoropolymer particles in the aqueous dispersion to 40 to 70% by weight, followed by addition of a surfactant to stabilize the aqueous dispersion, thereby obtaining a translucent white aqueous dispersion of a fluoropolymer. With respect to the final concentration of the fluoropolymer in the aqueous dispersion, these is no particular limitation and the obtained aqueous dispersion may be diluted with water, so long as the aqueous dispersion is stable; however, the final concentration of the fluoropolymer in the aqueous dispersion is preferably 5 to 70% by weight, more preferably 20 to 65% by weight, most preferably 30 to 60% by weight. The average diameter of the primary particles of the fluoropolymer in the aqueous dispersion is preferably in the range of from 0.01 to 0.6 $\mu$m, more preferably from 0.05 to 0.4 $\mu$m, most preferably 0.18 to 0.3 $\mu$m.

With respect to the surfactant used for stabilizing the aqueous dispersion of a fluoropolymer, it is preferred to use a noionic surfactant, such as an ethoxydated alkylphenol or an ethoxydated higher alcohol. The amount of the surfactant is generally in the range of from 1 to 15% by weight, preferably 2 to 10% by weight, more preferably 3 to 7% by weight. Further, it is preferred that the pH of the aqueous dispersion of a fluoropolymer is adjusted to 9 to 10. When the fluoropolymer concentration of the aqueous dispersion is 60%, the specific weight of the aqueous dispersion is 1.5 and the viscosity of the aqueous dispersion is in the range of from 15 to 30 cp (at 25° C.).

Specific examples of aqueous fluoropolymer dispersions which can be preferably used in the present invention include "Teflon 30J" manufactured and sold by DuPont-Mitsui Fluorochemicals Company Limited, Japan, "Polyflon D-1", "Polyflon D-2", "Polyflon D-2C" and "Polyflon D-2CE", each manufactured and sold by Daikin Industries, Ltd., Japan.

With respect to the above-mentioned powder mixture of a fluoropolymer and other resins, such as AS and PMMA, reference can be made to, for example, Unexamined Japanese Patent Application Laid-Open Specification No. 9-95583, Unexamined Japanese Patent Application Laid-Open Specification No. 11-49912, Unexamined Japanese Patent Application Laid-Open Specification No. 2000-143966 and Unexamined Japanese Patent Application Laid-Open Specification No. 2000-297189. Specific examples of fluoropolymer-containing powder mixtures which can be advantageously used in the present invention include "Blendex 449" manufactured and sold by GE Speciality Chemicals, U.S.A., and "Metablen A-3000" manufactured and sold by Mitsubishi Rayon Co., Ltd., Japan.

The fluoropolymer is generally used in an amount of from 0.01 to 3 parts by weight, preferably from 0.05 to 2 parts by weight, more preferably from 0.1 to 1 part by weight, most preferably from 0.2 to 0.6 parts by weight, relative to 100 parts by weight of the resin component. When the amount of the fluoropolymer is less than 0.01 part by weight, the effect of the fluoropoymer to prevent the dripping of flaming particles is likely to become unsatisfactory, so that it becomes difficult to achieve a high flame retardancy. On the other hand, when the amount of the fluoropolymer exceeds 3 parts by weight, the melt fluidity and impact resistance of the resin composition are likely to be lowered.

In the method of the present invention, the above-mentioned resin component, the above-mentioned organic phosphorus compound and optionally the above-mentioned fluoropolymer are kneaded by using a screw extruder to produce a flame retardant polycarbonate resin composition.

Specifically, in the method of the present invention, the flame retardant polycarbonate resin composition is produced by using a screw extruder comprising one or more supply inlets for the resin component and the organic phosphorus compound, and an extrusion outlet for a flame retardant resin composition, wherein the resin component is continuously fed to the extruder through the supply inlet, while continuously feeding the organic phosphorus compound to the extruder through the same supply inlet as used for feeding the resin component or through a supply inlet other than used for feeding the resin component, the resin component and the organic phosphorus compound being extruded toward the extrusion outlet under kneading. In the method of the present invention, the temperature of the resin component in the extruder is not higher than 300° C., and the residence time of the resin component in the extruder is not more than 40 seconds.

Further, in the method of the present invention, it is preferred that the resin component fed to the extruder is in the solid state. In this case, it is preferred that the extruder comprises a zone (a), a zone (b) and a zone (c) which are arranged in this order as viewed in an extrusion direction of the extruder, wherein zone (c) communicates directly with the extrusion outlet for the flame retardant resin composition, and the resin component present in zone (a) is maintained in a non-molten state, and the resin component present in zone (b) is maintained in a partially molten state, and the resin component present in zone (c) is maintained in a completely molten state.

In the case where the resin component and the organic phosphorus compound are kneaded together by using an extruder having the above-mentioned zones (a) to (c), it is preferred that the extruder has a supply inlet (a') for the resin component and a supply inlet (b') for the organic phosphorus compound, wherein supply inlet (a') communicates directly with zone (a), and supply inlet (b') communicates directly with zone (b), wherein the resin component is fed to zone (a) through supply inlet (a'), and the organic phosphorus compound is fed to zone (b) through supply inlet (b'), and wherein the feeding rate (kg/hr) of the organic phosphorus compound is in the range of from 1 to 30%, based on the feeding rate (kg/hr) of the resin component. In this case, it is preferred that the resin filling ratio in the extruder is increased at zone I for preventing the organic phosphorus compound from flowing back to zone (a), wherein the resin filling ratio is defined as a volume ratio of the resin component to an inner space of the extruder. The above-mentioned zone I is positioned in zone (b) and positioned upstream of the feeding point of the organic phosphorus compound as viewed in an extrusion direction of the extruder. Further, in this case, the kneading of the resin component and the organic phosphorus compound is performed mainly in region II (hereinafter, referred to as the "main kneading zone II") downstream of the feeding point of the organic phosphorus compound as viewed in an extrusion direction of the extruder.

In the case where the resin component, the organic phosphorus compound and the aqueous dispersion of a fluoropolymer are kneaded together with an extruder having the above-mentioned zones (a) to (c), it is preferred that the extruder has one or more inlets (a') communicating directly with zone (a), and the resin component is continuously fed to zone (a) through supply inlet (a'), whereas the aqueous dispersion of a fluoropolymer is continuously fed to zone (a) separately from the resin component through the same supply inlet (a') as used for feeding the resin component or through a supply inlet (a') other than used for feeding the resin component, wherein the feeding rate (kg/hr) of the aqueous dispersion of a fluoropolymer is in the range of from 0.01 to 10%, based on the feeding rate (kg/hr) of the resin component.

In the present invention, as the above-mentioned extruder, it is preferred to use a twin-screw extruder, and it is most preferred to use a corotating intermeshing twin-screw extruder. In the case of the corotating intermeshing twin-screw extruder, the two screws intermesh with each other, so that the extruder has the advantages of being self-cleaning during the operation of the extruder, the residence time of the resin in the extruder can be shortened, and the extruder has excellent resin-conveying ability, kneading ability and degassing ability. For this reason, such a corotating intermeshing twin-screw extruder is preferably used in the present invention. Especially, the use of a corotating intermeshing twin-screw extruder which is usable for high torque operation and is capable of achieving a high screw revolution rate is preferred from the view-point of improving the production rate and lowering the temperature of the molten resin during the kneading. Specifically, it is preferred to use an extruder capable of achieving a screw revolution rate of 300 rpm or more, more advantageously 400 rpm or more, still more preferably 500 rpm or more.

Specific examples of extruders which are most preferably used in the method of the present invention include extruders of "TEM-SS" series, manufactured and sold by Toshiba Machine Co., Ltd., Japan, and extruders of "ZSK-MC" series, manufactured and sold by Werner & Pfleiderer GmbH, Germany, and extruders of "TEX Super α-II" series, manufactured and sold by The Japan Steel Works Ltd., Japan.

The extruder used in the method of the present invention has a cylindrical barrel (hereinafter, referred to simply as "cylinder") which is composed of a plurality of cylinder blocks, such as cylinder blocks B1 to B9 of the extruder shown in FIG. 1, wherein mutually adjacent cylinder blocks are connected.

Further, in the method of the present invention, it is preferred to use a twin-screw extruder in which the screw construction (screw profile) of the twin-screw extruder can be freely chosen, by changing the combination of screw elements, and the temperatures of the cylinder blocks of the extruder can be individually controlled. When such an extruder is used, the screw construction and the temperature distribution in the extruder can be appropriately selected to adjust the Length of each of the above-mentioned zones (a) to (c) and to form zone I and the above-mentioned main kneading zone II.

As a specific example of extruders which can be advantageously used in the method of the present invention, there can be mentioned an extruder having an internal structure shown in FIG. 1. FIG. 1 is an explanatory diagrammatic side view showing the internal structure of one form of an extruder used in the method of the present invention. The screw construction shown in FIG. 1 is one form of a screw construction which is preferred in the present invention. Further descriptions regarding FIG. 1 are provided, infra.

We now provide details with respect to the screw elements used in the method of the present invention.

Examples of screw elements which can be preferably used in the method of the present invention include a flighted screw element having positive conveying action, a flighted screw element having counter-conveying action, a kneading element having positive conveying action, a kneading element having counter-conveying action, a kneading element having neutral conveying action, a screw mixing element having positive conveying action, a screw mixing element having counter-conveying action and a seal ring element. By appropriately combining these screw elements, a desired screw construction can be obtained.

Hereinbelow, an explanation is made with respect to each of the screw elements and the effects achieved thereby, referring to FIGS. 4(a) to 11(b).

FIG. 4(a) is an explanatory diagram showing a flighted screw element having positive conveying action, which is securely held on a rotation shaft of an extruder, as viewed from an extrusion outlet of the extruder. FIG. 4(b) is an explanatory side view of the above-mentioned flighted screw element having positive conveying action. The "flighted screw element having positive conveying action" means a screw element which has a continuous right-handed screw structure, and has the ability to convey the resin component in an extrusion direction of the extruder by the rotation of the screw (wherein the direction of the screw rotation is clockwise as viewed from an extrusion outlet of the extruder). In the twin-screw extruder which is preferably used in the method of the present invention, a pair or a plurality of pairs of the flighted screw elements having positive conveying action are provided in opposite relationship on the two rotation shafts. The number of flights of the flighted screw element having positive conveying action is generally selected within the range of from 1 to 3 depending on the desired effects to be achieved by the screw element. FIGS. 4(a) and 4(b) show a flighted screw element having 2 flights, which is most frequently used in the present invention. In FIG. 4(a), the ratio of a screw outer diameter ($D_o$) to the screw inner diameter ($D_i$) is generally in the range of from 1.3 to 1.8. In the present invention, the $D_o/D_i$ ratio is preferably in the range of from 1.4 to 1.7, more preferably from 1.5 to 1.6, most preferably 1.55. Further, the flight pitch is generally 0.5 to 2.0 times the screw outer diameter $D_o$, and is appropriately selected depending on the desired effect achieved by the element. Generally, the larger the flight pitch, the higher the conveying rate of the resin component, whereas the smaller the flight pitch, the lower the conveying rate of the resin component. In the case where the flighted screw element having positive conveying action shown in FIGS. 4(a) and 4(b) is used, the resin component is conveyed from right to left in FIG. 4(b).

Figure 5A:
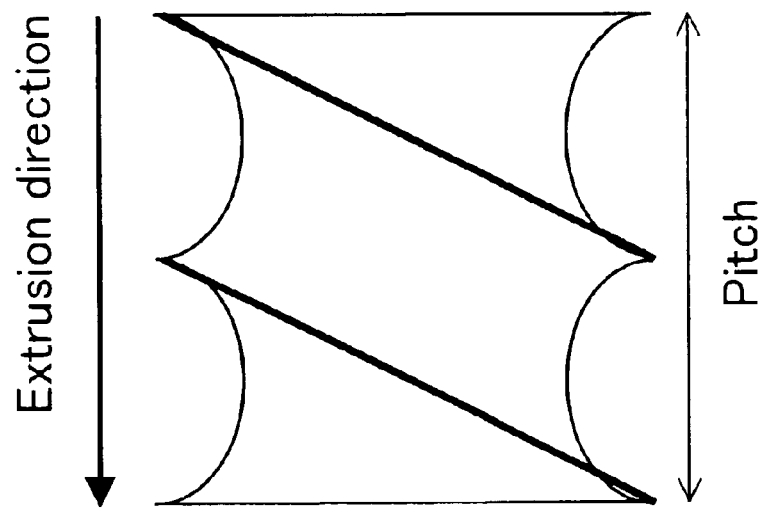
Figure 5B:
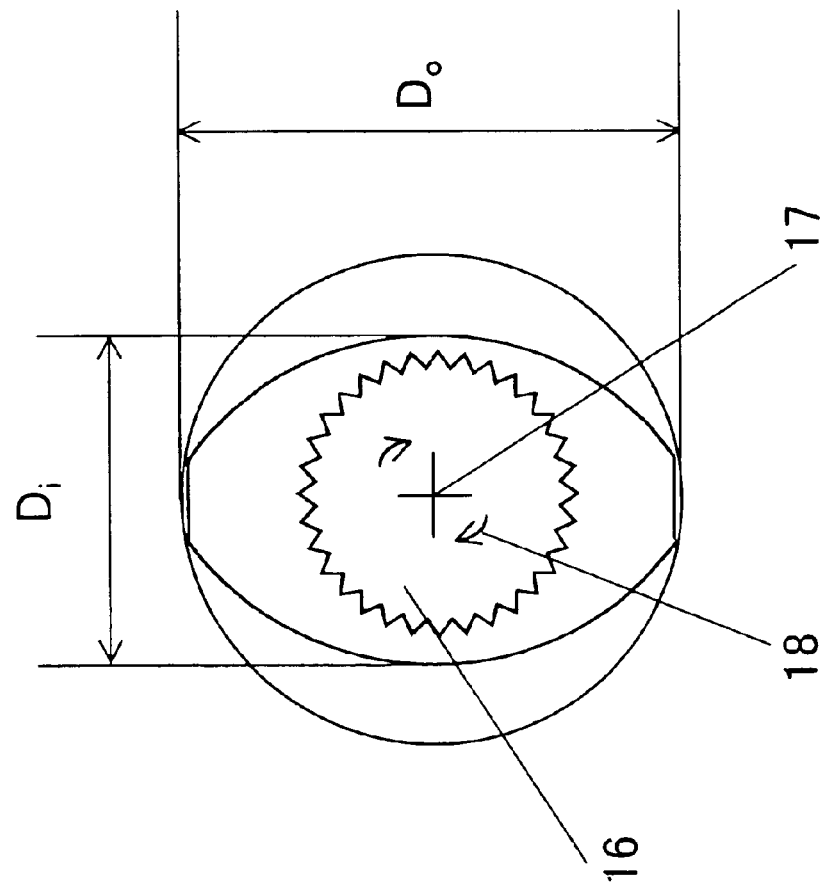

FIG. 5(a) is an explanatory diagram showing a flighted screw element having counter-conveying action, which is securely held on a rotation shaft of an extruder, as viewed from an extrusion outlet of the extruder. FIG. 5(b) is an explanatory side view of the above-mentioned flighted screw element having counter-conveying action. The "flighted screw element having counter-conveying action" means a screw element which has a continuous left-handed screw structure, and has the ability to convey the resin component in a direction opposite to the extrusion direction by the rotation of the screw (wherein the direction of the screw rotation is counterclockwise as viewed from an extrusion outlet of the extruder). In the twin-screw extruder which is preferably used in the method of the present invention, a pair or a plurality of pairs of the flighted screw elements having counter-conveying action are provided in an opposite relationship on the two rotation shafts. FIGS. 5(a) and 5(b) show a 2-flighted screw element having counter-conveying action, which is most preferably and frequently used in the present invention. The number of flights is generally 2, and the $D_o/D_i$ ratio is generally in the range of from 1.3 to 1.8. Further, the flight pitch is generally 0.5 to 1.0 times the screw outer diameter $D_o$. The flighted screw element having counter-conveying action has the high ability to convey the resin component in a direction opposite to the extrusion direction. Therefore, by the use of the flighted screw element having counter-conveying action, it is possible to achieve the resin filling ratio of about 1 (i.e., the space in the extruder can be substantially completely filled with the resin) at a portion upstream of the flighted screw element having counter-conveying action as viewed from the extrusion direction of the extruder. Accordingly, when screw elements having the high kneading ability (such as the below-described kneading element having positive conveying action, kneading element having counter-conveying action, kneading element having neutral conveying action, screw mixing element having positive conveying action, and screw mixing element having counter-conveying action) are positioned upstream of the flighted screw element having counter-conveying action as viewed from the extrusion direction of the extruder, it becomes possible to conduct the kneading of the resin component under conditions wherein the inner space of the extruder is substantially completely filled with the resin component, so that a very strong kneading effect can be achieved.

FIG. 6(a) is an explanatory diagram showing a kneading element having positive conveying action, which is securely held on a rotation shaft of an extruder, as viewed from an extrusion outlet of the extruder.

FIG. 6(b) is an explanatory side view of the above-mentioned kneading element having positive conveying action. The "kneading element having positive conveying action" means a screw element comprising a plurality of quasi-elliptical discs which are securely held successively in parallel on the rotation shaft of the extruder so that the rotation axis of the shaft passes through the center of each quasi-elliptical disc, and which are arranged in a staggered manner as shown in FIG. 6(a), wherein the staggering angle of mutually adjacent discs (with respect to the discs which are successively disposed on the rotation shaft in a direction opposite to the extrusion direction of the extruder) is more than 0° and less than 90° in a plus (+) direction wherein the rotation direction of the rotation shaft is defined as the plus (+) direction. When an extruder having this kneading element is operated, the kneading element simultaneously exhibits the effect of conveying the resin component in an extrusion direction and the effect of kneading the resin component. The number of the above-mentioned quasi-elliptical discs used for forming the kneading element having positive conveying action is generally 3 or more, preferably 5 or more. It is preferred that the quasi-elliptical disc has a thickness which is 0.05 to 0.5 times the major axis of the quasi-elliptical disc. With respect to the quasi-elliptical disc, it is preferred that the ratio of a major axis to a minor axis is in the range of from 1.1 to 2.0. Further, it is preferred that the ratio of the major axis of the quasi-elliptical disc to the inner diameter of the cylinder of the extruder is in the range of from 0.95 to 0.995. FIGS. 6(a) and 6(b) show a kneading element having positive conveying action which is most preferably used in the present invention, which comprises 5 quasi-elliptical discs S1 to S5 which are securely held successively in parallel on the rotation shaft of the extruder and arranged in a staggered manner, wherein the staggering angle of the mutually adjacent discs is +45°.

Figure 7B:
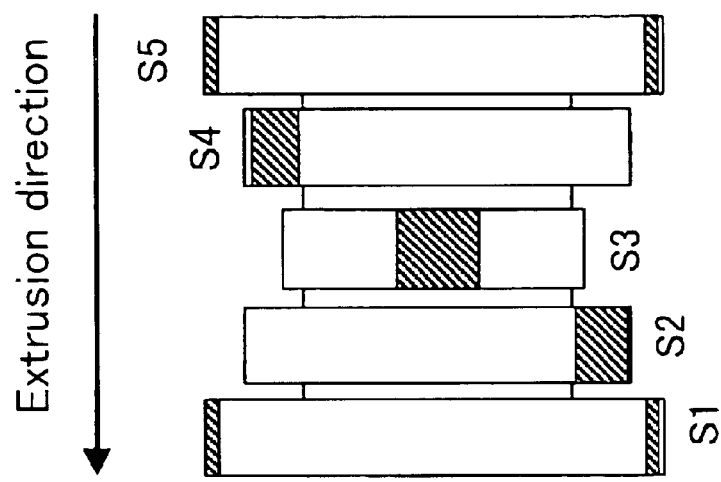
Figure 7A:
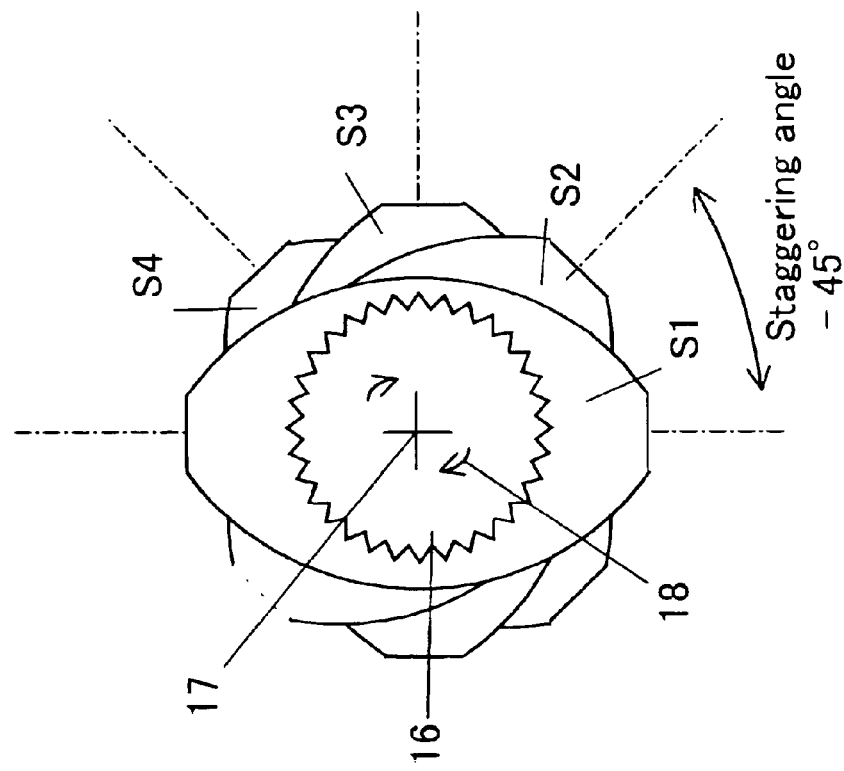

FIG. 7(a) is an explanatory diagram showing a kneading element having counter-conveying action, which is securely held on a rotation shaft of an extruder, as viewed from an extrusion outlet of the extruder. FIG. 7(b) is an explanatory side view of the above-mentioned kneading element having counter-conveying action. The "kneading element having counter-conveying action" means a screw element comprising a plurality of quasi-elliptical discs which are securely held successively in parallel on the rotation shaft of the extruder so that the rotation axis of the shaft passes through the center of each quasi-elliptical disc, and which are arranged in a staggered manner as shown in FIG. 7(a), wherein the staggering angle of mutually adjacent discs (with respect to the discs which are successively disposed on the rotation shaft in a direction opposite to the extrusion direction of the extruder) is more than 0° and less than 90° in a minus (−) direction wherein the counter-rotation direction of the rotation shaft is defined as the minus (−) direction. When an extruder having this kneading element is operated, the kneading element simultaneously exhibits the effect of conveying the resin component in a direction opposite to the extrusion direction and the effect of kneading the resin component. The number of the above-mentioned quasi-elliptical discs used for forming the kneading element having counter-conveying action is generally 3 or more, preferably 5 or more. With respect to the quasi-elliptical disc used for forming the kneading element having counter-conveying action, the thickness, the major axis/minor axis ratio and the ratio of the major axis thereof to the inner diameter of the cylinder of the extruder may be the same as mentioned above in connection with the kneading element having positive conveying action. FIGS. 7(a) and 7(b) show a kneading element having counter-conveying action which is most preferably used in the present invention, which comprises 5 quasi-elliptical discs S1 to S5 which are securely held successively in parallel on the rotation shaft of the extruder and arranged in a staggered manner, wherein the staggering angle of the mutually adjacent discs is 45° in the minus (−) direction of the rotation shaft, namely −45°.

FIG. 8(a) is an explanatory diagram showing a kneading element having neutral conveying action, which is securely held on a rotation shaft of an extruder, as viewed from an extrusion outlet of the extruder. FIG. 8(b) is an explanatory side view of the above-mentioned kneading element having neutral conveying action. The "kneading element having neutral conveying action" means a screw element comprising a plurality of quasi-elliptical discs which are securely held successively in parallel on the rotation shaft of the extruder so that the rotation axis of the shaft passes through the center of each quasi-elliptical disc, and which are arranged in a staggered manner as shown in FIG. 8(a), wherein the staggering angle of mutually adjacent discs (with respect to the discs which are successively disposed on the rotation shaft in a direction opposite to the extrusion direction of the extruder) is substantially 90° in either of the above-mentioned plus (+) and minus (−) directions. When an extruder having this kneading element is operated, the kneading element exhibits the effect of kneading the resin component. However, since the staggering angle of the mutually adjacent discs used in this kneading element is substantially 90°, this kneading element is not able to convey the resin component in an extrusion direction or a direction opposite to the extrusion direction. The number of the above-mentioned quasi-elliptical discs used for forming the kneading element having neutral conveying action is generally 3 or more, preferably 5 or more. With respect to the quasi-elliptical disc used for forming the kneading element having neutral conveying action, the thickness, the major axis/minor axis ratio and the ratio of the major axis thereof to the inner diameter of the cylinder of the extruder may be the same as mentioned above in connection with the kneading element having positive conveying action. By the use of the kneading element having neutral conveying action, it is possible to achieve a very strong kneading effect, as compared to the case where the kneading element having positive conveying action or counter-conveying action is used. FIGS. 8(a) and 8(b) show a kneading element having neutral conveying action which is most preferably used in the present invention, which comprises 5 quasi-elliptical discs S1 to S5 which are securely held successively in parallel on the rotation shaft of the extruder and arranged in a staggered manner.

FIG. 9(a) is an explanatory diagram showing a screw mixing element having positive conveying action, which is securely held on a rotation shaft of an extruder, as viewed from an extrusion outlet of the extruder. FIG. 9(b) is an explanatory side view of the above-mentioned screw mixing element having positive conveying action. The "screw mixing element having positive conveying action" means a screw element which has a structure wherein the flights of the flighted screw element having positive conveying action are notched as depicted in FIGS. 9(a) and 9(b). When an extruder having this screw mixing element is operated, a portion of the resin component is conveyed in an extrusion direction by the flights of the screw mixing element, whereas the remainder of the resin component is conveyed in a direction opposite to the extrusion direction through the notches of the flights, to thereby agitate the resin component. In the twin-screw extruder which is preferably used in the method of the present invention, a pair or a plurality of pairs of the screw mixing elements having positive conveying action are provided in an opposite relationship on the two rotation shafts. FIGS. 9(a) and 9(b) show a screw mixing element having positive conveying action, which is most preferably and frequently used in the present invention.

Figure 10B:
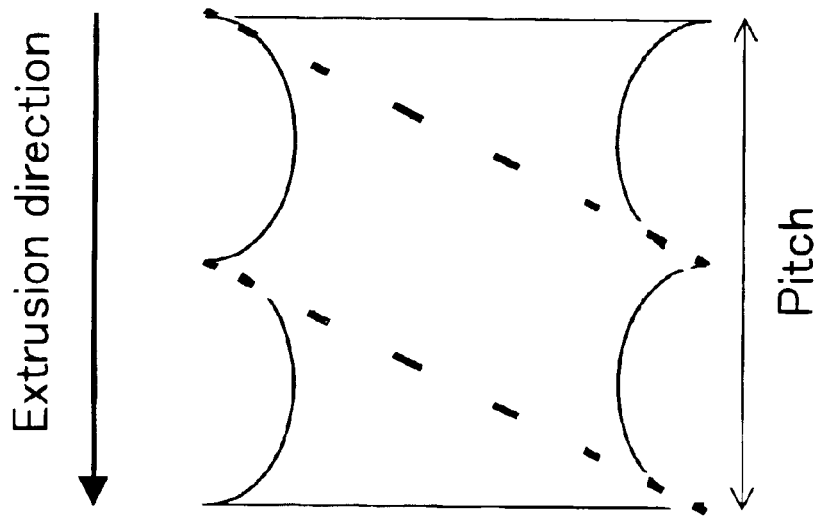
Figure 10A:
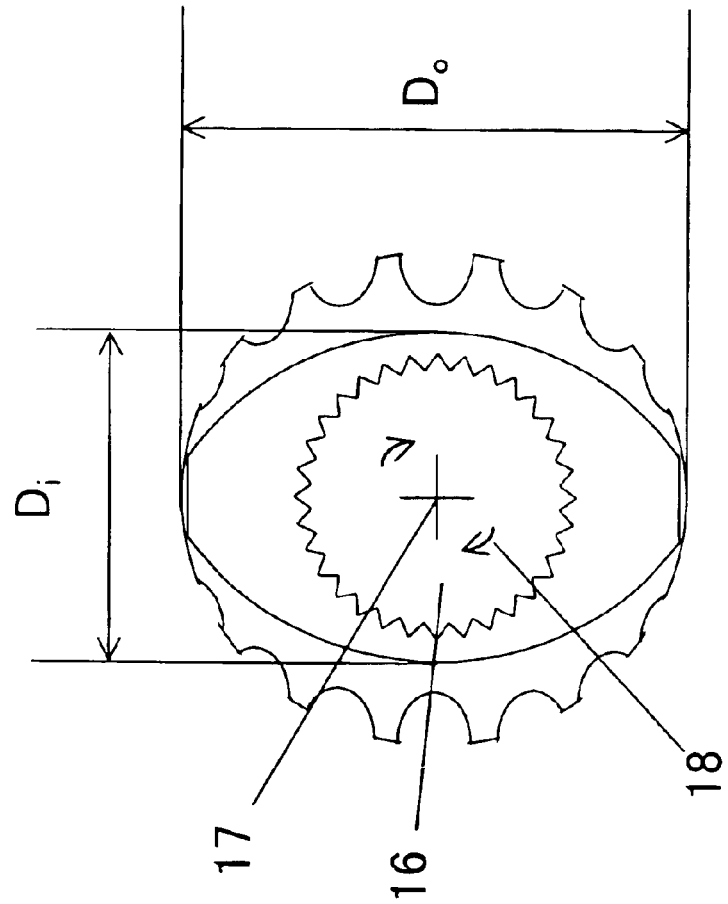

FIG. 10(a) is an explanatory diagram showing a screw mixing element having counter-conveying action, which is securely held on a rotation shaft of an extruder, as viewed from an extrusion outlet of the extruder. FIG. 10(b) is an explanatory side view of the above-mentioned screw mixing element having counter-conveying action. The "screw mixing element having counter-conveying action" means a screw element which has a structure wherein the flights of the flighted screw element having counter-conveying action are notched as depicted in FIGS. 10(a) and 10(b). When an extruder having this screw mixing element is operated, a portion of the resin component is conveyed in a direction opposite to the extrusion direction by the flights of the screw mixing element, whereas the remainder of the resin component is conveyed in an extrusion direction through the notches of the flights, to thereby agitate the resin component. Since this screw element has a left-handed screw structure as viewed from an extrusion outlet of the extruder, when the extruder having this screw element is operated, this screw element exhibits a strong effect of conveying the resin in a direction opposite to the extrusion direction, thereby increasing the resin filling ratio. Therefore, this screw element has a strong effect of kneading the resin composition, as compared to the case of the screw mixing element having positive conveying action. In the twin-screw extruder which is preferably used in the method of the present invention, a pair or a plurality of pairs of the screw mixing elements having counter-conveying action are provided in an opposite relationship on the two rotation shafts. FIGS. 10(a) and 10(b) show a screw mixing element having counter-conveying action, which is most preferably used in the present invention.

FIG. 11(a) is an explanatory diagram showing a seal ring element, which is securely held on a rotation shaft of an extruder, as viewed from an extrusion outlet of the extruder. FIG. 11(b) is an explanatory side view of the above-mentioned seal ring element. The "seal ring element" means a screw element comprising at least one substantially circular disc. When an extruder having this seal ring element is operated, the seal ring element blocks the flow of the resin inside the extruder, thereby increasing the resin filling ratio. In this case, the resin travels through the clearance between the seal ring element and the inner wall of the cylinder of the extruder. In the twin-screw extruder which is preferably used in the method of the present invention, generally, a pair of the seal ring elements are provided in an opposite relationship on the two rotation shafts. However, if desired, more than one pair of the seal ring elements may be used. It is preferred that the seal ring element has a thickness which is 0.05 to 0.5 times the screw outer diameter ($D_o$). Further, it is preferred that the ratio of the screw outer diameter ($D_o$) to the inner diameter of the cylinder of the extruder is in the range of from 0.950 to 0.995. FIGS. 11(a) and 11(b) show a seal ring element which is most preferably used in the present invention.

In the method of the present invention, the resin component present in zone (a) is maintained in a non-molten state. In zone (a), for example, the melting of the resin component comprising a polycarbonate can be prevented by using only the flighted screw element having positive conveying action in the screw portion in zone (a), and setting the cylinder block temperature in zone (a) at 20 to 200° C., preferably 30 to 100° C., more preferably 40 to 70° C. The length of zone (a) is influenced not only by the screw construction and the cylinder block temperature in zone (a) but also by the screw revolution rate and the feeding rate of the resin component. Specifically, by increasing the screw revolution rate or the feeding rate of the resin component, the length of zone (a) can be increased. In zone (a), no melting of the resin component (which is in the form of pellets, a powder or a mixture thereof) is observed. This can be confirmed by visual observation through an opening of the cylinder block of the extruder (i.e., inlet (a') of the extruder) or an observation hole formed in the cylinder wall of the extruder. In the method of the present invention, when the aqueous dispersion of a fluoropolymer is used, the aqueous dispersion is continuously fed to zone (a) of the extruder. In this case, the most preferred feeding point of the aqueous dispersion of a fluoropolymer is below the hopper for feeding the resin component. The temperature of the cylinder block having the hopper is preferably in the range of from 30 to 70° C.

In the method of the present invention, the resin component in zone (b) is maintained in a partially molten state. In zone (b), for example, the resin component can be partially molten by using, in zone (b), the flighted screw element having positive conveying action or a combination thereof with other screw elements, such as the kneading element having positive conveying action, the kneading element having counter-conveying action, the kneading element having neutral conveying action, the screw mixing element having positive conveying action and the screw mixing element having counter-conveying action, and by setting the cylinder block temperature in zone (a) at 201 to 350° C., preferably 210 to 300° C., more preferably 220 to 280° C. In this case, a part of the resin component is molten by both the kneading action of the screw element and the heat provided by the cylinder block. In zone (b), as mentioned above, the resin component is in a partially molten state. This can be confirmed by either a method in which the state of the resin is visually observed through an observation hole formed in the cylinder wall of the extruder or by a method in which the operation of the extruder is stopped and the cylinder of the extruder is allowed to cool and, then, the screw is withdrawn from the extruder to observe the appearance of the resin to determine the state of the resin during the operation of the extruder (when this method is employed, the feeding of the organic phosphorus compound as a flame retardant is also stopped). In either of these two methods, the non-molten portion of the resin component during the extrusion can be easily distinguished from the molten portion of the resin component. In zone (b), it is preferred that the ratio of the resin component which is in a molten state is in the range of from 0.01 to 90% by weight, more advantageously from 0.1 to 70% by weight, more advantageously from 1 to 50% by weight.

In the method of the present invention, it is preferred to feed the organic phosphorus compound as a flame retardant to zone (b). The organic phosphorus compound can be fed to the extruder at a predetermined rate by means of a gear pump or a plunger pump through an injection nozzle attached to a cylinder block of the extruder. With respect to the screw construction in a region of the extruder where the organic phosphorus compound is fed, it is preferred to use the flighted screw element having positive conveying action or the screw mixing element having positive conveying action to achieve a resin filling ratio of less than 1, preferably 0.4 to 0.8, thereby lowering the resin pressure in zone (b), so that the feeding of the organic phosphorus compound can be easily conducted.

With respect to the screw construction in the above-mentioned "main kneading zone II", it is preferred to use a combination of a screw element having a high sealing ability with respect to the resin component (such as the flighted screw element having counter-conveying action, or the seal ring element) and screw elements (positioned upstream of the screw element having a high sealing ability) having a high melt-kneading ability (such as the kneading element having positive conveying action, the kneading element having counter-conveying action, the kneading element having neutral conveying action, the screw mixing element having positive conveying action and the screw mixing element having counter-conveying action). Further, the temperature of the cylinder block in main kneading zone II is generally in the range of from 201 to 350° C., preferably from 210 to 300° C., more preferably from 220 to 280° C. Thus, in main kneading zone II, the resin component and the organic phosphorus compound and, if desired, the fluoropolymer are satisfactorily melt-kneaded by the kneading action of the screw elements and the heat supplied by the cylinder block of the extruder, wherein the resin filling ratio is 1 (i.e., the inner space of the extruder is completely filled with the molten resin composition). In the method of the present invention, it is necessary that the screw construction in main kneading zone II be selected such that the melt-kneading is effected in main kneading zone II to an extent wherein non-molten resin particles are not observed with respect to the resin component which has traveled to main kneading zone II. The state of the resin component which has traveled to main kneading zone II (i.e., the resin component in zone (c)) can be observed by either a method in which the state of the resin is visually observed through an observation hole formed in the cylinder wall of the extruder or by a method in which the operation of the extruder is stopped and the cylinder of the extruder is allowed to cool and, then, the screw is withdrawn from the extruder to observe the appearance of the resin to determine the state of the resin during the operation of the extruder. The extruder used in the method of the present invention may comprise one or more main kneading zones II.

As mentioned above, zone I is provided to prevent the organic phosphorus compound fed to zone (b) from flowing back to zone (a). This is achieved by appropriately selecting the screw construction in zone I. For example, in zone I, the screw comprises 1 to 3 screw elements selected from the group consisting of a kneading element having positive conveying action, a kneading element having counter-conveying action, a kneading element having neutral conveying action and a flighted screw element having a neutral conveying action and having a narrow flight pitch (0.5 to 0.8 times the outer diameter $D_o$ of the screw element), whereby the resin filling ratio is adjusted to 0.7 to 1.0. The cylinder block temperature in zone I is generally set at 201 to 350° C., preferably 210 to 300° C., more preferably 220 to 280° C. With respect to zone I (hereinafter, frequently referred to as the "zone I for preventing flowback of the organic phosphorus compound"), the length thereof and the resin filling ratio therein change depending on the feeding rate (Q) of the resin component and the screw revolution rate (Ns). Generally, the larger the ratio (Q/Ns), the larger the length of zone I and the larger the resin filling ratio in zone I.

Further, in the method of the present invention, when an extruder having a vent is used, the above-mentioned main kneading zone II is formed upstream of the vent as viewed in an extrusion direction of the extruder. In this case, it is also preferred to form, in the extruder, a zone III for preventing the molten resin from flowing out of the extruder through the vent (such a zone is hereinafter, frequently referred to as the "zone III for preventing venting-up of the resin"). In zone III for preventing venting-up of the resin, the resin filling ratio is adjusted to 0.7 to 1.0 to thereby lower the resin filling ratio at a zone which is close to the vent and is downstream of zone III for preventing venting-up of the resin as viewed from the extrusion direction of the extruder, thereby preventing the molten resin from flowing out of the extruder through the vent. With respect to the screw construction of zone III for preventing venting-up of the resin, screw elements selected from the group consisting of a kneading element having positive conveying action, a kneading element having counter-conveying action, a kneading element having neutral conveying action, a flighted screw element having counter-conveying action and a seal ring element are appropriately combined. Further, the cylinder block temperature in zone III for preventing venting-up of the resin is generally set at 201 to 350° C., preferably 210 to 300° C., more preferably 220 to 280° C.

Further, as a screw element provided below the vent, a flighted screw element having positive conveying action is used. Through the vent, degassing can be effected, if desired, under reduced pressure by using a vacuum pump or the like.

The method of the present invention for producing a flame retardant polycarbonate resin composition containing an organic phosphorus compound as a flame retardant has the following features (1) to (3).

(1) The first feature of the present invention is the use of an organic phosphorus compound having an acid value of not more than 0.1 mgKOH/g. By the use of this organic phosphorus compound having an acid value of not more than 0.1 mgKOH/g, it is possible to obtain an excellent flame retardant polycarbonate resin composition, in which not only a reduction in the mechanical strength but also a deterioration of the color can be greatly suppressed even under high temperature and high humidity conditions.

(2) The second feature of the method of the present invention is that the temperature of the resin component in the extruder is not higher than 300° C. In the method of the present invention, the extrusion is generally conducted under conditions wherein the temperature of the resin component in the extruder is the highest around the die of the extruder. Therefore, the temperature of the molten resin measured around the die is defined as the highest temperature of the resin component in the extruder. The temperature of the molten resin around the die can be measured by a thermocouple attached to the extruder near the die. The temperature of the resin component is influenced not only by the temperature conditions in the extruder, but also by other conditions, such as the screw construction, the feeding rate of each component, and the screw revolution rate. In the present invention, these conditions are appropriately selected so that the temperature of the resin component in the extruder does not exceed 300° C. If the temperature of the resin component in the extruder exceeds 300° C., the decomposition of the organic phosphorus compound is likely to occur rapidly to cause the deterioration of the resin component, thereby increasing the melt fluidity of the resin component. As a result, disadvantages, such as a marked lowering of the impact resistance of the resin composition, are likely to occur. Further, the resultant resin composition suffers a marked lowering of mechanical properties and a marked deterioration of the color when placed under high temperature and high humidity conditions. With respect to the temperature of the resin component in the extruder, for improving the mechanical properties of the resin composition and suppressing the discoloration of the resin component, it is preferred that the temperature is as low as possible, as long as the melt-kneading of the resin component is possible. However, when the temperature of the resin component in the extruder is too low, the viscosity of the molten resin component increases and hence, a load on the extruder becomes large and the productivity of the resin composition becomes low. Therefore, for achieving a good balance of the properties of the resin composition and the productivity, the temperature of the resin in the extruder is preferably in the range of from 230 to 290° C., more preferably from 240 to 285° C., most preferably from 250 to 280° C.

(3) The third feature of the method of the present invention is that the residence time of the resin component in the extruder is not more than 40 seconds. In the present invention, the residence time of the resin component in the extruder is measured by a method in which several color pellets are extruded. That is, the residence time is defined as a period of time between the time at which several color pellets of the resin component are fed to an extruder through an inlet for a resin component and the time at which a colored resin ascribed to the feeding of the color pellets begins to be discharged from the die of the extruder. In the method of the present invention, by virtue of the short residence time of not more than 40 seconds, it becomes possible to suppress very effectively a lowering of the mechanical properties and a deterioration of the color with respect to the resin composition even under high temperature and high humidity conditions (i.e., a resin composition having excellent resistance to high temperature and high humidity conditions can be obtained). However, if the residence time of the resin component in the extruder is too short, it is likely that the kneading of the resin component becomes insufficient, so that the properties of the resultant resin composition becomes unsatisfactory. In the present invention, the residence time of the resin component in the extruder is preferably from 1 to 35 seconds, more preferably from 5 to 30 seconds, still more preferably from 8 to 25 seconds, most preferably from 10 to 20 seconds.

The residence time of the resin component in the extruder is influenced by various factors, especially by the feeding rate of each component, the screw revolution rate, the L/D (length/diameter) value of the extruder and the volume of the space in the die.

In the present invention, for shortening the residence time of the resin component in the extruder, it is preferred that the L/D value of the extruder is as small as possible, as long as the melt-kneading can be satisfactorily effected in the extruder. Specifically, the L/D of the extruder is preferably within the range of from 25 to 50, more preferably from 30 to 45, still more preferably from 35 to 40. Further, it is also preferred that the volume of the space in the die is as small as possible to prevent the increase in the residence time of the resin component.

The feeding rate of each component and the screw revolution rate are also appropriately selected so as to achieve the above-mentioned value of residence time. The feeding rate of each component to the extruder is limited by the performance of the extruder. However, by increasing the feeding rate of each component as much as possible, the temperature of the molten resin in the extruder can be advantageously lowered, and the residence time of the resin component in the extruder can also be advantageously shortened. With respect to the screw revolution rate, generally, the higher the screw revolution rate, the shorter the residence time of the resin component in the extruder. However, when the screw revolution rate is too high, the temperature of the resin component is markedly elevated by the shearing force of the screw. When the temperature of the resin component in the extruder becomes too high, properties and color of the resin composition are harmfully affected. Therefore, it is preferred that the screw revolution rate is appropriately selected, taking the temperature of the resin component in the extruder into consideration.

As mentioned above, in the method of the present invention, it is preferred that an extruder having the above-mentioned zones (a) to (c) (e.g., the extruder shown in FIG. 1 described below) is used, and the organic phosphorus compound is fed to zone (b) of the extruder. In this case, by feeding the organic phosphorus compound to zone (b) of the extruder, the molten resin can be easily plasticized and the viscosity of the molten resin can be lowered, so that the marked temperature elevation of the molten resin by the shearing force (generated by the screw revolution) can be prevented. Therefore, it becomes possible to produce the resin composition by operating the extruder under conditions wherein the screw revolution rate is relatively high. This is advantageous for producing a resin composition having an excellent resistance to high temperature and high humidity conditions at a high production rate, since the resin-conveying ability of the extruder becomes high when the screw revolution rate is high, so that the residence time of the resin component in the extruder can be shortened.

Hereinbelow, an explanation is made with respect to preferred production conditions other than mentioned above in connection with the above-mentioned features (1) to (3) of the present invention.

In the present invention, it is preferred that the organic phosphorus compound is in the form of a liquid. Further, as mentioned above, it is preferred that the organic phosphorus compound is fed to zone (b) through supply inlet (b'), separately from the resin component (i.e., without mixing the organic phosphorus compound with the resin component before feeding thereof to the extruder). When the organic phosphorus compound is fed to zone (b) wherein the resin component is maintained in a partially molten state, the organic phosphorus compound is mixed with resin component simultaneously with the melting of the resin component, so that the organic phosphorus compound serves as a plasticizer during the melting of the resin component. Therefore, the feeding of the organic phosphorus compound is advantageous in that the melting of the resin component becomes easy, that the load on the extruder can be alleviated, and that the production rate of the resin composition becomes high. Further, the viscosity of the molten resin component can be lowered by the addition of the organic phosphorus compound and hence, the marked elevation of the temperature of the resin by the shearing force during the kneading can be prevented, so that a resin composition having excellent color and high mechanical strength can be obtained.

It is preferred that the organic phosphorus compound is heated to 60 to 120° C., more advantageously 70 to 100° C. in advance so as to lower the melt viscosity thereof, and the heated organic phosphorus compound is fed to the extruder at a predetermined rate through an injection nozzle attached to a preselected cylinder block of an extruder by using a gear pump or a plunger pump. In the method of the present invention, when the organic phosphorus compound is in the form of a powder, the organic phosphorus compound powder may be mixed with the resin component in advance, and the resultant mixture may be fed to the extruder to conduct the melt-kneading of the mixture. However, it is preferred that the organic phosphorus compound powder is heated to 60 to 120° C. to thereby melt the organic phosphorus compound, and the resultant liquid organic phosphorus compound is fed to zone (b) by the above-mentioned method.

When the organic phosphorus compound fed to a certain point in zone (b) at a high rate within the above-mentioned range, there is a danger that the organic phosphorus compound fed to the extruder flows back to the upstream of the feeding point of the organic phosphorus compound as viewed from the extrusion direction (hereinafter, this phenomenon is referred to as the "flowback of the organic phosphorus compound"). The flowback of the organic phosphorus compound is likely to occur when the feeding rate of the organic phosphorus compound is high and/or when the resin component in the form of pellets is used. When the resin component in the form of pellets is fed to the extruder, the pellets are not completely molten at zone (b) and hence, the partially molten resin component in zone (b) has voids through which the organic phosphorus compound can flow, so that the flowback of the organic phosphorus compound likely to occur. When the organic phosphorus compound flows back to the portion below the hopper for feeding of the resin component, the feeding of the resin component to the extruder becomes difficult. For avoiding this disadvantage, it is effective to form the above-mentioned zone I for preventing flowback of the organic phosphorus compound. With respect to the length of zone I, since the main purpose of this zone is not the kneading, it is sufficient for zone I to have a minimum length required for preventing the flowback of the resin component. As an example of screw constructions in zone I, there can be mentioned a screw construction comprising 1 to 3 screw elements selected from the group consisting of a kneading element having positive conveying action, a kneading element having counter-conveying action, a kneading element having neutral conveying action and a flighted screw element having a positive conveying action and having a narrow flight pitch (0.5 to 0.8 times the outer diameter $D_o$ of the screw element). By the use of such a screw construction, a part of the resin component can be molten by the shearing force of the screw elements and the voids in the partially molten pellets of the resin component can be reduced. In zone I, it is preferred that the resin filling ratio is 0.7 to 1.0. When the length of zone I is too large, the temperature of the molten resin component is elevated by the shearing force of the screw, thereby causing disadvantages, such as a deterioration of the color of the resin composition, a lowering of the mechanical strength (e.g., impact resistance) of the resin composition, and an increase in the load on the extruder, which leads to a lowering of the productivity. Further, for preventing the disadvantageous elevation of the resin temperature, it is preferred that a screw element having a high sealing ability (such as a flighted screw element having counter-conveying action and a seal ring element) is not used in zone I. By virtue of the presence of zone I, the continuous operation of the extruder can be stably conducted even when a large amount of the organic phosphorus compound is added to the resin component (e.g., when the organic phosphorus compound is used in an amount of 15 to 30 parts by weight, relative to 100 parts by weight of the resin component).

In the method of the present invention, for producing a flame retardant polycarbonate resin composition which not only has excellent mechanical strength and color, but also the excellent effect of preventing the dripping of flaming particles when the resin composition is on fire, it is preferred that the extrusion is performed at a specific energy of from 0.13 to 0.20 kW·hr/kg. The specific energy is defined as the output energy (kW) of a screw extruder-operating motor which energy is consumed for producing the flame retardant polycarbonate resin composition at a rate of 1 kg/hr, and is used a yardstick to gauge the force of kneading. When the specific energy is less than 0.13 kW·hr/kg, the kneading of the components of the resin composition is likely to be insufficient to achieve the desired properties of the resin composition. When the specific energy exceeds 0.20 kW·hr/kg, the temperature of the molten resin component is likely to be greatly elevated by the shearing force of the screw, thereby causing disadvantages, such as a marked discoloration of the resin composition, a lowering of the impact resistance and elongation of the resin composition and a lowering of the ability of the resin composition to prevent the dripping of flaming particles. In the present invention, the specific energy is preferably in the range of from 0.135 to 0.18 kW·hr/kg, more preferably from 0.14 to 0.17 kW·hr/kg, most preferably from 0.145 to 0.16 kW·hr/kg. The specific energy can be adjusted by appropriately selecting the screw construction, the screw revolution rate, the feeding rate of each component, the cylinder block temperatures, the molecular weight of the resin, the ratio of the components fed to the extruder and the like.

In the method of the present invention, when the organic phosphorus compound is fed to zone (b) wherein the resin component is maintained in a partially molten state, the kneading of the resin component is conducted in the presence of the organic phosphorus compound as a flame retardant, so that the organic phosphorus compound serves as a plasticizer during the melting of the resin component and hence, the resin component can be efficiently plasticized even when the cylinder block temperatures are low.

Therefore, it is possible to conduct the melt-kneading at a low specific energy even when the cylinder block temperatures are low. Further, by feeding the organic phosphorus compound to zone (b) and conducting the melt-kneading under low temperature conditions, it becomes possible to obtain a flame retardant polycarbonate resin composition having excellent mechanical properties, flame retardancy and color.

In the method of the present invention, when an aqueous dispersion of a fluoropolymer is used, as mentioned above, it is preferred that the aqueous dispersion of a fluoropolymer is continuously fed to zone (a) separately from the resin component, wherein the feeding rate (kg/hr) of the aqueous dispersion of the fluoropolymer is in the range of from 0.01 to 10%, based on the feeding rate (kg/hr) of the resin component. When the feeding rate of the aqueous dispersion of the fluoropolymer is less than 0.01% of the feeding rate of the resin component, the dripping-preventive effect becomes unsatisfactory. On the other hand, when the feeding rate of the aqueous dispersion of the fluoropolymer is more than 10% of the feeding rate of the resin component, a disadvantage is likely to occur such that the feeding of the resin component becomes unstable by, for example, the bridging of the resin component at the inlet for the resin component, and that a large amount of water (contained in the aqueous dispersion) gets mixed with the resin component to thereby lower the properties of the resin composition. The term "bridging" used herein means a phenomenon in which the resin component gets mixed with a large amount of the aqueous dispersion of a fluoropolymer, so that the resin component and the aqueous dispersion form a wet mass having no flowability in the extruder around the inlet. In the method of the present invention, when the aqueous dispersion of a fluoropolymer is fed to the extruder at the above-mentioned feeding rate, the fluoropolymer can be uniformly dispersed in the resin component. Therefore, it becomes possible to obtain a resin composition throughout which fluoropolymer fibrils are uniformly formed. The obtained resin composition exhibits the excellent effect of preventing the dripping of flaming particles when the resin composition is on fire. Further, the feeding of the aqueous dispersion of a fluoropolymer to zone (a) is also advantageous in that the fluoropolymer serves as a lubricant in the melt-kneading of the resin component, thereby suppressing the elevation of the temperature of the molten resin component, and lowering the load on the extruder during the melt-kneading.

Further, when the aqueous dispersion of a fluoropolymer is fed to the extruder, as described above, the most preferred feeding point of the aqueous dispersion of a fluoropolymer is below the hopper for feeding the resin component, and the temperature of the cylinder block having the hopper is preferably in the range of from 30 to 100° C., more preferably from 40 to 70° C.

In the method of the present invention, there is a tendency that the higher the screw revolution rate, the more uniform the dispersion of the fluoropolymer in the resin component, so that a resin composition having an excellent effect of preventing the dripping of flaming particles can be obtained. The screw revolution rate is preferably 200 to 1,500 rpm, more preferably 300 to 1,000 rpm, still more preferably 400 to 800 rpm. However, as the screw revolution rate increases, the temperature of the molten resin in the extruder increases, thereby causing a discoloration of the resin composition and a lowering of the mechanical properties of the resin composition. Therefore, the screw revolution rate should be appropriately selected, considering the temperature of the resin in the extruder, the feeding rate of each component, the specific energy and the like.

The temperature of the aqueous dispersion of the fluoropolymer continuously fed to the extruder is generally 5 to 30° C., preferably 5 to 20° C., more preferably 5 to 15° C. When the temperature of the aqueous dispersion of a fluoropolymer is high, a coagulation of the fluoropolymer is likely to occur. For example, when the temperature of the aqueous dispersion fed to the extruder is higher than 30° C., it is possible that the pump or pipeline for feeding the aqueous dispersion is clogged by the coagulated fluoropolymer. On the other hand, even when the temperature of the aqueous dispersion is lowered to less than 5° C., substantially no appreciable effect is produced and hence, the energy used for lowering the temperature of the aqueous dispersion is worthless.

As the pump used for feeding the aqueous dispersion of a fluoropolymer, a diaphragm pump, a plunger pump, a tubing pump and the like can be used. For continuously feeding the aqueous dispersion of a fluoropolymer at a predetermined rate, it is preferred to use a diaphragm pump. For the purpose of suppressing the coagulation of the fluoropolymer and stably feeding the aqueous dispersion of the fluoropolymer, it is preferred to use a pump in which an occurrence of contact between mechanical parts is suppressed and the area of the contacting portions of such mechanical parts is small. Such mechanical parts are those which are brought into contact with each other so as to produce a pumping effect. Specifically, such mechanical parts are a diaphragm and a check valve in the case of a diaphragm pump, a piston and a check valve in the case of a plunger pump, and portions of a tube which are squeezed by a pinch (rotor) in the case of a tubing pump.

Further, for preventing the clogging of the pipeline and injection nozzle for feeding the aqueous dispersion of a fluoropolymer into the extruder, it is preferred that each of the pipeline and the injection nozzle has a double tube structure and the aqueous dispersion is cooled by means of a cooling apparatus, such as a circulating chiller.

Hereinbelow, an explanation is made with respect to a preferred mode of the method of the present invention, referring to FIG. 1.

FIG. 1 is an explanatory diagrammatic side view showing the internal structure of one form of an extruder which can be preferably used in the method of the present invention.

The extruder shown in FIG. 1 is an intermeshing corotating twin-screw extruder comprising nine cylinder blocks B1 to B9 and die adapter block 8 which are arranged in this order as viewed in an extrusion direction of the extruder. With respect to the extruder shown in FIG. 1, a desired screw construction can be obtained by appropriately selecting and combining screw elements, and the temperatures of the cylinder blocks can be individually controlled.

In FIG. 1, zones designated as "a" "b" and "c" are, respectively, zone (a) in which the resin component is maintained in a non-molten state, zone (b) in which the resin component is maintained in a partially molten state, and zone (c) in which the resin component is maintained in a completely molten state.

With respect to the screw construction of the extruder shown in FIG. 1, each screw of the extruder has, as viewed in an extrusion direction of the extruder, five flighted screw elements 10 each having positive conveying action, one kneading element 11 having positive conveying action, which is composed of five quasi-elliptical discs, one kneading element 12 having counter-conveying action, which is composed of five quasi-elliptical discs, two screw mixing elements 13 each having positive conveying action, two kneading elements 11 each having positive conveying action, two kneading elements 14 each having neutral conveying action, each of which is composed of five quasi-elliptical discs, one kneading element 12 having counter-conveying action, which is composed of seven quasi-elliptical discs, one flighted screw element 15 having counter-conveying action, three flighted screw elements 10 each having positive conveying action, one kneading element 11 having positive conveying action, which is composed of five quasi-elliptical discs, one kneading element 12 having counter-conveying action, which is composed of five quasi-elliptical discs, one flighted screw element 15 having counter-conveying action, and four flighted screw elements 10 each having positive conveying action.

With respect to the temperatures of nine cylinder blocks B1 to B9, the temperature of first cylinder block B1 is preferably set at 30 to 70° C., the temperature of second cylinder block B2 is preferably set at 180 to 220° C., the temperature of third cylinder block B3 is preferably set at 220 to 260° C., the temperature of fourth cylinder block B4 is preferably set at 220 to 280° C., the temperatures of fifth to ninth cylinder blocks B5 to B9 are preferably individually set at 220 to 270° C., and the temperature of die adapter block 8 is preferably set at 230 to 270° C.

In the method of the present invention, resin component 3a-1 (composed only of a polycarbonate, or comprising a polycarbonate and the above-mentioned resin other than a polycarbonate) and, if desired, additive component 3a-2 are individually fed at predetermined rates to inlet 1(a') through hopper 2 by means of a gravimetric feeder, a belt feeder, etc. The number of the feeder is not particularly limited. Separately from the resin component, the aqueous dispersion of a fluoropolymer is fed to first cylinder block B1 or second cylinder block B2 (i.e., zone (a)), preferably fed to hopper 2 provided on first cylinder block B1, wherein the feeding rate (kg/hr) of the aqueous dispersion of the fluoropolymer is in the range of from 0.01 to 10%, based on the feeding rate (kg/hr) of the resin component. As mentioned above, the temperature of first cylinder block B1 is preferably set at 30 to 70° C.

In the extruder shown in FIG. 1, zone (b) extends through third to fifth cylinder blocks B3 to B5, in which the resin component is maintained in a partially molten state, i.e., the resin component is present in the form of a mixture of a molten resin component and a non-molten resin component. The organic phosphorus compound is heated to 60 to 120° C. in advance, and the heated organic phosphorus compound is fed to inlet 5(b') through injection nozzle 5b attached to fourth cylinder block B4 by means of a gear pump (not shown) or a plunger pump (not shown), wherein the feeding rate (kg/hr) of the organic phosphorus compound is in the range of from 1 to 30%, based on the feeding rate (kg/hr) of the resin component. Through injection nozzle 5b, the organic phosphorus compound is fed to the extruder at a portion intermediate between zone I (for preventing flowback of the organic phosphorus compound) and kneading zone II. The fed organic phosphorus compound serves as a plasticizer facilitating the melting of the resin component to thereby alleviate the load on the extruder and lower the heat generated by the shearing force of the screws, so that a high quality resin composition can be produced at a high rate.

In zone I (for preventing flowback of the organic phosphorus compound) of the extruder shown in FIG. 1, the screw has a construction wherein one kneading element 11 having positive conveying action and one kneading element 12 having counter-conveying action are used in combination. By virtue of such a construction, a part of the resin component is squashed and molten by the shearing force of the screws, and the resin filling ratio of 0.7 to 1.0 can be realized by the counter-conveying action (i.e., action to convey the resin component in a direction opposite to the extrusion direction) of kneading element 12. Thus, by virtue of the presence of zone I, it becomes possible to prevent the organic phosphorus compound fed to inlet 5(b') from flowing back to zone (a) positioned upstream of inlet 5(b') as viewed from the extrusion direction of the extruder.

In kneading zone II of the extruder shown in FIG. 1, by combining kneading element 11 having positive conveying action, kneading element 14 having neutral conveying action, kneading element 12 having counter-conveying action and flighted screw element 15 having counter-conveying action, the resin component, the organic phosphorus compound, the fluoropolymer and other optional component are satisfactorily melt-kneaded under conditions wherein the resin filling ratio is 1. If the melt-kneading in kneading zone II is unsatisfactory, disadvantages are likely to occur such that a resin composition having a desired quality cannot be constantly obtained, and that the operation of the extruder is forced to be stopped by disruption of the discharge of the extruded strand etc., so that the continuous production of a resin composition cannot be stably conducted. On the other hand, if the melt-kneading is conducted too vigorously, the resin composition would suffer disadvantages, such as a deterioration of the color, and a lowering of the flame retardancy and the mechanical properties.

In zone III for preventing the venting-up of the molten resin through vent 6, the resin filling ratio is raised. In zone III of the extruder shown in FIG. 1, the screw is composed of one kneading element 11 having positive conveying action, one kneading element 12 having counter-conveying action and one flighted screw element 15 having counter-conveying action. If desired, the extrusion may be conducted such that the kneading is also vigorously conducted in zone III.

In the extruder shown in FIG. 1, through vent 6, degassing can be effected, preferably under reduced pressure.

Further, if desired, screen 7 for removing impurities may be attached to die adapter 8. The strand discharged from outlet 9 is cooled with water, followed by pelletizing, to thereby obtain a flame retardant polycarbonate resin composition.

In the method of the present invention, as mentioned above, the temperature of the resin component in the extruder can be measured by a thremocouple attached to the extruder near the die. Each of the temperature of the resin component in the extruder and the specific energy is influenced by operation conditions, such as the screw construction, the feeding rate of each component, the screw revolution rate, the temperature distribution in the extruder, etc. In the method of the present invention, by appropriately selecting or controlling the above-mentioned operation conditions, the temperature of the resin component in the extruder are adjusted to not more than 300° C., and the specific energy is preferably adjusted within the range of 0.13 to 0.20 kW·hr/kg.

There is no particular limitation with respect to the method for molding (shaping) the flame retardant polycarbonate resin composition obtained by the method of the present invention. Examples of methods for molding the resin composition include extrusion molding, compression molding, injection molding and gas-assisted injection molding. Among these methods, injection molding is preferred.

Examples of shaped articles which can be produced from the resin composition include housings for office automation machines, such as notebook computers, monitors for personal computers, copying machines and printing machines; chassis for office automation machines; and housings for portable telephones.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, polycarbonate resin compositions were produced using the following components.

1. Aromatic Polycarbonate (PC-1)

A bisphenol A polycarbonate (in the form of pellets) produced by the phosgene process was used as PC-1.

Specifically, PC-1 was a pellet mixture of Iupilon S-2000 and Iupilon H-4000, each manufactured and sold by Mitsubishi Engineering-Plastics Corporation, Japan (weight ratio of Iupilon S-2000 to Iupilon H-4000=60/40).

(PC-2)

A bisphenol A polycarbonate (in the form of pellets) produced by the molten-state transesterification process, which has a weight average molecular weight (Mw) of 22,000 and a terminal phenolic group ratio of 33%, was used as PC-2.

(PC-3)

A bisphenol A polycarbonate (in the form of a mixture of pellets and a powder) produced by the phosgene process was used as PC-3.

Specifically, PC-3 was a mixture of Iupilon S-2000 F (powder) and Iupilon H-4000 (pellets), each manufactured and sold by Mitsubishi Engineering-Plastics Corporation, Japan (weight ratio of Iupilon S-2000 F to Iupilon H-4000= 75/25).

2. Rubber-modified Styrene Resin (ABS-1)

A commercially available ABS resin (pellets) (trade name: PA709N, manufactured and sold by Chi Mei Corporation, Taiwan) was used as ABS-1.

Specifically, ABS-1 was composed of an acrylonitrile-butadiene-styrene (ABS) resin produced by bulk polymerization and an ABS resin produced by emulsion polymerization (butadiene rubber content=22 wt %).

(ABS-2)

A commercially available powdery ABS resin (trade name: RC, manufactured and sold by Mitsubishi Rayon Co., Ltd., Japan) was used as ABS-2.

(SAN)

Acrylonitrile-styrene copolymer (pellets) having an Mw of 110,000 was used as SAN. SAN had the following composition.

| Acrylonitrile unit content: | 25.0% by weight |
|---|---|
| Styrene unit content: | 75.0% by weight |

(MBS)

A commercially available powdery methyl methacrylate-butadiene-styrene copolymer (trade name: M-51, manufactured and sold by FORMOSA PLASTICS CORPORATION, Taiwan) was used as MBS.

3. Organic Phosphorus Compound (Phosphate-1)

An organic phosphorus compound oligomer represented by formula (1) above, wherein all of the groups $R^a$, $R^b$, $R^c$ and $R^d$ are phenyl groups, was used as Phosphate-1. Phosphate-1 has a weight average polymerization degree (N) of 1.10, an acid value of 0.01 mg KOH/g, a magnesium content of 2.5 ppm and a chlorine content of not more than 1 ppm.

(Phosphate-2)

An organic phosphorus compound oligomer represented by formula (1) above, wherein all of the groups $R^a$, $R^b$, $R^c$ and $R^d$ are phenyl groups, was used as Phosphate-2. Phosphate-2 has a weight average polymerization degree (N) of 1.12, an acid value of 0.05 mg KOH/g, a magnesium content of 5.2 ppm and a chlorine content of not more than 1 ppm.

(Phosphate-3)

An organic phosphorus compound oligomer represented by formula (1) above, wherein all of the groups $R^a$, $R^b$, $R^c$ and $R^d$ are phenyl groups, was used as phosphate-3. Phosphate-3 has a weight average polymerization degree (N) of 1.09, an acid value of 0.51 mg KOH/g, a magnesium content of 7.5 ppm and a chlorine content of not more than 1 ppm.

(Phosphate-4)

Resorcinol bis(diphenyl)phosphate (trade name: CR733S, manufactured and sold by Daihachi Chemical Industry Co., Ltd., Japan) was used as Phosphate-4. Phosphate-4 has an acid value of 0.05 mg KOH/g, and a magnesium content of 3.4 ppm.

4. Fluoropolymer (Dis. PTFE)

A commercially available aqueous dispersion of polytetrafluoroethylene (PTFE) (trade name: Polyflon D-2CE; manufactured and sold by Daikin Industries, Ltd., Japan; PTFE content: 60% by weight), which contains polyoxyethylene alkyl ether as a surfactant, was used as Dis. PTFE.

(PTFE-containing Powdery Polymer Blend)

A commercially available powdery polymer blend containing polytetrafluoroethylene and an acrylonitrile-styrene copolymer (weight ratio of the polytetrafluoroethylene to the acrylonitrile-styrene copolymer=50/50) (trade name: Blendex 449, manufactured and sold by GE Speciality Chemicals Corporation, U.S.A.) was used as a PTFE-containing powdery polymer blend.

5. Other components (Additive-1)

A commercially available n-octadecyl-3-(3',5'-ditertiarybutyl-4'-hydroxyphenyl)propionate (trade name: IRGANOX 1076, manufactured and sold by Ciba Speciality Chemicals, Switzerland) was used as Additive-1.

(Additive-2)

A commercially available tris(2,4-ditertiarybutylphenyl) phosphite (trade name: IRGAFOS 168, manufactured and sold by Ciba Speciality Chemicals, Switzerland) was used as Additive-2.

EXAMPLE 1

A flame retardant polycarbonate resin composition was produced by melt-kneading the below-described components using a twin-screw extruder (TEM-58SS, manufactured and sold by Toshiba Machine Co., Ltd., Japan; L/D= 37) having a structure as shown in FIG. 2.

Figure 2:
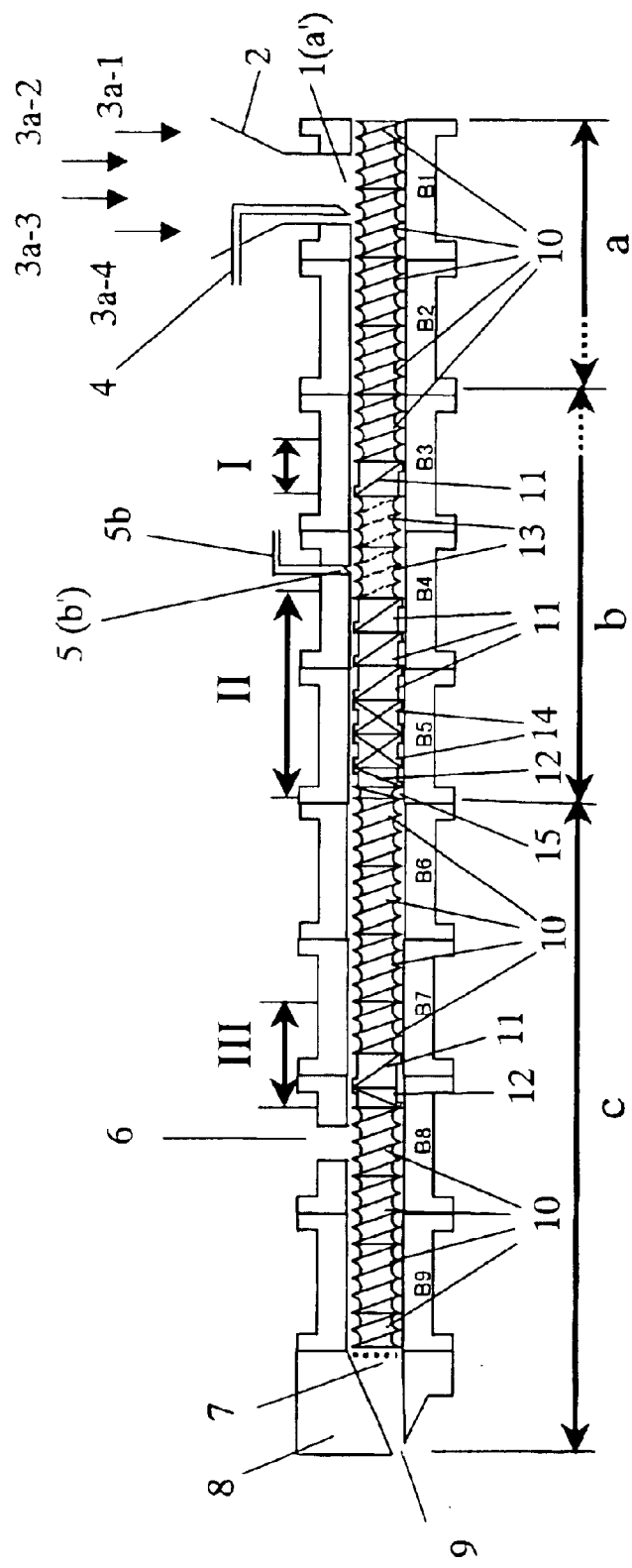
FIG. 2 is an explanatory diagrammatic side view showing the internal structure of an extruder used in Examples 1 to 3 and Comparative Examples 1 to 4.

With respect to the screw construction of the twin-screw extruder shown in FIG. 2, each screw of the extruder has, from the upstream to downstream in the extruder as viewed in an extrusion direction of the extruder, five flighted screw elements 10 each having positive conveying action, one kneading element 11 having positive conveying action, which is composed of five quasi-elliptical discs, two screw mixing elements 13 each having positive conveying action, three kneading elements 11 each having positive conveying action, each of which is composed of five quasi-elliptical discs, two kneading elements 14 each having neutral conveying action, each of which is composed of five quasi-elliptical discs, one kneading element 12 having counter-conveying action, which is composed of seven quasi-elliptical discs, one flighted screw element 15 having counter-conveying action, four flighted screw elements 10 each having positive conveying action, one kneading element 11 having positive conveying action, which is composed of five quasi-elliptical discs, one kneading element 12 having counter-conveying action, which is composed of seven quasi-elliptical discs, and four flighted screw elements 10 each having positive conveying action.

With respect to the temperatures of nine cylinder blocks B1 to B9, the temperature of first cylinder block B1 was set at 50° C., the temperature of second cylinder block B2 was set at 220° C., the temperature of third cylinder block B3 was set at 250° C., the temperature of fourth cylinder block B4 was set at 260° C., the temperature of each of fifth to ninth cylinder blocks B5 to B9 was set at 250° C., and the temperature of die adapter block 8 was set at 250° C.

A polycarbonate pellet mixture (PC-1) 3a-1, pellets of an ABS resin (ABS-1) 3a-2, powdery methyl methcrylate-butadiene-styrene copolymer (MBS) 3a-3, and powder mixture 3a-4 of Additive-1 and Additive-2 (Additive-1:Additive-2=10:1) were continuously fed to inlet 1(a') of the extruder through hopper 2 at rates of 560 kg/hr, 120 kg/hr, 20 kg/hr and 0.7 kg/hr, respectively. An aqueous dispersion of a fluoropolymer (Dis. PTFE), which had been cooled to 10° C., was continuously fed to inlet 1(a') of the extruder through nozzle 4 (cooled to 10° C. by a circulating cooling medium) at a rate of 3.5 kg/hr by means of a diaphragm pump. The zone designated "a" in FIG. 2 is zone (a) defined in the present invention. By visual observation through inlet 1(a'), it was confirmed that the resin component was in a non-molten state.

An organic phosphorus compound (Phosphate-1), which had been heated to 80° C., was continuously fed to inlet 5(b') of the extruder through nozzle 5b at a rate of 100 kg/hr by means of a plunger pump. The zone designated "b" in FIG. 2 is zone (b) defined in the present invention. By visual observation through an observation hole (not shown) formed in cylinder block B4, it was confirmed that the resin component was in a partially molten state.

The zone designated "I" in FIG. 2 is a "zone for preventing backflow of the organic phosphorus compound", in which the above-mentioned kneading element 11 having positive conveying action is provided to increase the resin filling ratio as measured in zone I which is positioned upstream of inlet 5(b') as viewed in an extrusion direction of the extruder, to thereby prevent the organic phosphorus compound fed to the extruder through inlet 5(b') from flowing back to zone (a). The zone designated "II" in FIG. 2 is the "main kneading zone", in which three kneading elements 11 each having positive conveying action, two kneading elements 14 each having neutral conveying action, one kneading element 12 having counter-conveying action, and one flighted screw element 15 having counter-conveying action are provided. The zone designated "III" in FIG. 2 is a "zone for preventing venting-up of the resin", in which one kneading element 11 having positive conveying action and one kneading element 12 having counter-conveying action are provided to thereby increase the resin filling ratio as measured in zone III which is positioned upstream of vent 6 as viewed in an extrusion direction of the extruder, thereby preventing the resin from flowing out of the extruder through vent 6.

The screw revolution rate was set at 480 rpm, and degassing was conducted at vent 6 under a reduced pressure of 50 mmHg. A 120-mesh screen 7 was attached to die adapter block 8. An extruded strand discharged from extrusion outlet 9 was cooled and then, pelletized to obtain pellets of a flame retardant polycarbonate resin composition.

The extrusion characteristics in Example 1 and the properties of the resin composition obtained in Example 1 were evaluated by the following methods.

(1) Temperature of the Molten Resin at the Die of the Extruder

The temperature (unit: ° C.) of the molten resin at the die of the extruder was measured by means of a thermocouple.

(2) Residence Time of the Resin Component in the Extruder

After the feeding of each component became stable, several black pellets of masterbatch were fed to the extruder through inlet 1(a'). The period of time between the time at which several black pellets were fed to the extruder through inlet 1(a') and the time at which a black-colored molten resin composition began to be discharged through the die was measured by means of a stopwatch and used as the residence time (unit: seconds) of the resin component in the extruder.

(3) Flame Retardancy

The obtained pellets were dried and then, subjected to an injection molding using an injection molding machine (AUTOSHOT 50D, manufactured and sold by FANUC LTD., Japan) at a cylinder temperature of 260° C. and a mold temperature of 60° C., to thereby obtain strip specimens (thickness: 1/16 inch) for evaluating the flame retardancy of the resin composition. The level of flame retardancy was evaluated by the 20 MM Vertical Burning Test described in UL-Subject 94 (the evaluations in accordance with the codes "V-0", "V-1" and "V-2" were conducted (degree of flame retardancy: V-0>V-1>V-2)).

(4) Change in Izod Impact Strength (Measured with Respect to a 1/8"-thick Strip Specimen) at 80° C. and 95 RH %

A notched strip specimen having a thickness of 1/8 inch was prepared by subjecting a resin composition to an injection molding at a cylinder temperature of 240° C. and a mold temperature of 60° C. The obtained strip specimen was held under high temperature and high humidity conditions (80° C. and 95 RH %), and the Izod impact strength was measured in accordance with ASTM-D256 (unit: kgf·cm/cm) at several points in time to evaluate the change in Izod impact strength with time.

(5) Change in Color (Measured with Respect to a 1/8"-thick Strip Specimen) at 80° C. and 95 RH %

A notched strip specimen having a thickness of 1/8 inch was prepared by subjecting a resin composition to an injection molding at a cylinder temperature of 240° C. and a mold temperature of 60° C. The obtained strip specimen was held under high temperature and high humidity conditions (80° C. and 95 RH %), and the yellowness index (YI) was measured by means of a color computer (Model SM5 differential calorimeter, manufactured and sold by Suga Test Instruments Co., Ltd., Japan) at several points in time to evaluate the change in color with time.

The results are shown in Table 1.

As can be seen from Table 1, even when the resin composition produced in Example 1 was held under high temperature and high humidity conditions, the change in the impact strength with time and the change in YI (i.e., change in color) with time were small, as compared to those in Comparative Examples 1–4 described below. These results clearly show that, by the method of the present invention, it is possible to produce a flame retardant polycarbonate resin composition containing an organic phosphorus compound, in which not only a lowering of the mechanical strength but also a deterioration of the color can be greatly suppressed even under high temperature and high humidity conditions.

EXAMPLE 2

The production of a flame retardant polycarbonate resin composition was conducted in substantially the same manner as in Example 1, except that Phosphate-2 was used instead of Phosphate-1.

The extrusion characteristics in Example 2 and the properties of the resin composition obtained in Example 2 were evaluated by the same methods as in Example 1. The results are shown in Table 1.

EXAMPLE 3

The production of a flame retardant polycarbonate resin composition was conducted in substantially the same manner as in Example 1, except that Phosphate-4 was used instead of Phosphate-1.

The extrusion characteristics in Example 3 and the properties of the resin composition obtained in Example 3 were evaluated by the same methods as used in Example 1. The results are shown in Table 1.

COMPARATIVE EXAMPLE 1

The production of a flame retardant polycarbonate resin composition was conducted in substantially the same manner as in Example 1, except that Phosphate-3 was used instead of Phosphate-1.

The extrusion characteristics in Comparative Example 1 and the properties of the resin composition obtained in Comparative Example 1 were evaluated by the same methods as in Example 1. The results are shown in Table 1. As can be seen from Table 1, with respect to the change in properties (impact strength and color) of the resin composition produced in Comparative Example 1 with time under high temperature and high humidity conditions, the impact strength is rapidly and markedly lowered with time, and the YI value rapidly and markedly increased (i.e., marked discoloration rapidly occurred), as compared to those of the resin composition produced in Example 1.

COMPARATIVE EXAMPLE 2

The production of a flame retardant polycarbonate resin composition was conducted in substantially the same manner as in Example 1, except that the temperatures of nine cylinder blocks B1 to B9 and die adapter block 8 were changed as follows: the temperature of first cylinder block B1 was set at 50° C., the temperature of second cylinder block B2 was set at 260° C., the temperature of third cylinder block B3 was set at 280° C., the temperature of each of fourth to ninth cylinder blocks B4 to B9 was set at 300° C., and the temperature of die adapter block 8 was set at 300° C. The temperature of the molten resin measured at the die of the extruder was 312° C. The extrusion characteristics in Comparative Example 2 and the properties of the resin composition obtained in Comparative Example 2 were evaluated by the same methods as in Example 1. The results are shown in Table 1.

COMPARATIVE EXAMPLE 3

A flame retardant polycarbonate resin composition was produced in substantially the same manner as in Example 1, except that the screw revolution rate was set at 900 rpm instead of 480 rpm. The temperature of the molten resin measured at the die of the extruder was 321° C. The extrusion characteristics in Comparative Example 3 and the properties of the resin composition obtained in Comparative Example 3 were evaluated by the same methods as in Example 1. The results are shown in Table 1.

COMPARATIVE EXAMPLE 4

The production of a flame retardant polycarbonate resin composition was produced in substantially the same manner as in Example 1, except that the feeding rates of polycarbonate resin (PC-1) 3a-1, ABS resin (ABS-1) 3a-2, MBS resin 3a-3, powder mixture 3a-4 of Additive-1 and Additive-2 (Additive-1: Additive-2=10:1), Dis. PTFE and Phosphate-1 were changed to 140 kg/hr, 30 kg/hr, 5 kg/hr, 0.17 kg/hr, 0.87 kg/hr and 25 kg/hr, and the screw revolution rate was changed to 350 rpm. The extrusion characteristics in Comparative Example 4 and the properties of the resin composition obtained in Comparative Example 4 were evaluated by the same methods as in Example 1. The results are shown in Table 1.

TABLE 1

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| Screw revolution rate [rpm] | 480 | 480 | 480 | 480 | 480 | 900 | 350 |
| Production rate of the resin composition [kg/hr] | 800 | 800 | 800 | 800 | 800 | 800 | 200 |
| Organic phosphorus compound | Phosphate-1 | Phosphate-2 | Phosphate-4 | Phosphate-3 | Phosphate-1 | Phosphate-1 | Phosphate-1 |
| Acid value of the organic phosphorus compound [mgKOH/g] | 0.01 | 0.05 | 0.05 | 0.51 | 0.01 | 0.01 | 0.01 |
| Temperature of the molten resin measured at the die of the extruder [° C.] | 261 | 262 | 264 | 262 | 312 | 321 | 275 |

TABLE 1-continued

| | | Example 1 | Example 2 | Example 3 | Comparative Example 1 | Comparative Example 2 | Comparative Example 3 | Comparative Example 4 |
|---|---|---|---|---|---|---|---|---|
| Residence time of the resin component in the extruder [sec] | | 15.3 | 15.5 | 15.8 | 15.5 | 15.1 | 12.2 | 65 |
| Flame retardancy [20 MM Vertical Burning Test described in UL-Subject 94 (thickness of test specimen: 1/16")] | | V-0 | V-0 | V-0 | V-0 | V-0 | V-0 | V-0 |
| Change in Izod impact strength at 80° C. and 95 RH % (measured with respect to a notched 1/8" specimen) [kgf · cm/cm] | 0 hr | 63 | 64 | 63 | 58 | 55 | 55 | 54 |
| | 24 hr | 55 | 52 | 52 | 45 | 41 | 38 | 35 |
| | 48 hr | 52 | 44 | 33 | 20 | 32 | 31 | 25 |
| | 96 hr | 42 | 35 | 25 | 18 | 15 | 15 | 18 |
| | 144 hr | 33 | 25 | 21 | 14 | 12 | 11 | 12 |
| | 192 hr | 25 | 18 | 16 | 9 | 8 | 7 | 10 |
| Change in YI value at 80° C. and 95 RH % | 0 hr | −0.3 | −0.2 | −0.3 | 3.2 | 2.8 | 3.5 | 2.0 |
| | 24 hr | 1.5 | 2.1 | 2.3 | 6.2 | 5.2 | 6.8 | 4.5 |
| | 48 hr | 2.1 | 2.8 | 4.3 | 9.3 | 8.6 | 10.2 | 7.1 |
| | 96 hr | 2.6 | 3.5 | 6.2 | 11.0 | 11.2 | 12.8 | 9.2 |

EXAMPLE 4

A flame retardant polycarbonate resin composition was produced by melt-kneading the below-described components using a twin-screw extruder (ZSK-25, manufactured and sold by Werner & Pfleiderer GmbH, Germany; L/D=37) having a structure as shown in FIG. 3.

Figure 3:
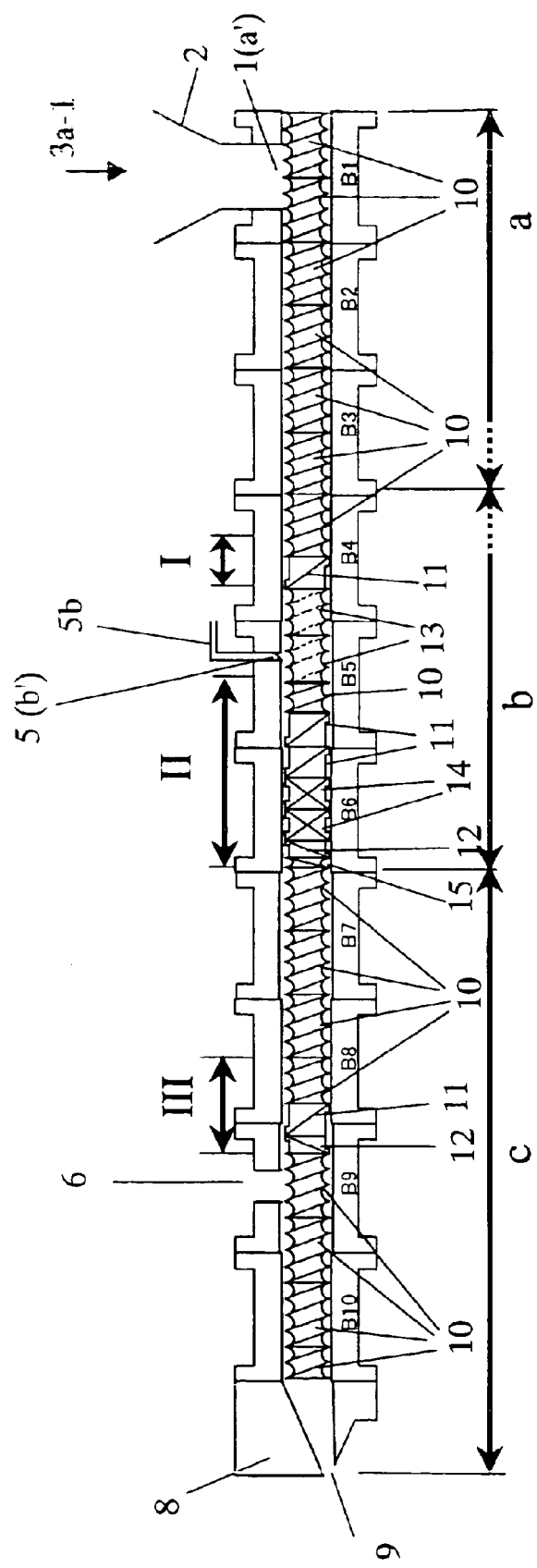
FIG. 3 is an explanatory diagrammatic side view showing the internal structure of an extruder used in Examples 4 to 6 and Comparative Examples 5 to 7.

With respect to the screw construction of the twin-screw extruder shown in FIG. 3, each screw of the extruder has, from the upstream to downstream in the extruder as viewed in an extrusion direction thereof, seven flighted screw elements 10 each having positive conveying action, one kneading element 11 having positive conveying action, which is composed of five quasi-elliptical discs, two screw mixing elements 13 each having positive conveying action, one flighted screw elements 10 having positive conveying action, two kneading elements 11 each having positive conveying action, each of which is composed of five quasi-elliptical discs, two kneading elements 14 each having neutral conveying action, each of which is composed of five quasi-elliptical discs, one kneading element 12 having counter-conveying action, which is composed of seven quasi-elliptical discs, one flighted screw element 15 having counter-conveying action, four flighted screw elements 10 each having positive conveying action, one kneading element 11 having positive conveying action, which is composed of five quasi-elliptical discs, one kneading element 12 having counter-conveying action, which is composed of seven quasi-elliptical discs, and five flighted screw elements 10 each having positive conveying action.

With respect to the temperatures of ten cylinder blocks B1 to B10, the temperature of first cylinder block B1 was set at 50° C., the temperature of second cylinder block B2 was set at 220° C., the temperature of third cylinder block B3 was set at 250° C., the temperature of fourth cylinder block B4 was set at 260° C., the temperature of each of fifth to tenth cylinder blocks B5 to B10 was set at 250° C., and the temperature of die adapter block 8 was set at 250° C.

A raw material mixture 3a-1 having the following composition was continuously fed to inlet 1(a') of the extruder through hopper 2 at a rate of 20 kg/hr.

(Composition of the Raw Material Mixture 3a-1)
  PC-2: 90 parts by weight
  ABS-2: 10 parts by weight
  Mixture of Additive-1 and Additive-2 (Additive-1:Additive-2=10:1): 0.1 part by weight
  Dis. PTFE: 0.5 part by weight An organic phosphorus compound (Phosphate-1), which had been heated to 80° C., was continuously fed to inlet 5(b') of the extruder through nozzle 5b at a rate of 2.8 kg/hr by means of a gear pump.

The zone designated "I" in FIG. 3 is a "zone for preventing backflow of the organic phosphorus compound", in which the above-mentioned kneading element 11 having positive conveying action is provided to increase the resin filling ratio as measured in zone I which is positioned upstream of inlet 5(b') as viewed from the extrusion direction of the extruder, to thereby prevent the organic phosphorus compound fed to the extruder through inlet 5(b') from flowing back to zone (a). The zone designated "II" in FIG. 3 is the "main kneading zone", in which two kneading elements 11 each having positive conveying action, two kneading elements 14 each having neutral conveying action, one kneading element 12 having counter-conveying action, and one flighted screw element 15 having counter-conveying action are provided. The zone designated "III" in FIG. 3 is a "zone for preventing venting-up of the resin" in which one kneading element 11 having positive conveying action and one kneading element 12 having counter-conveying action are provided to thereby increase the resin filling ratio as measured in zone III which is positioned upstream of vent 6 as viewed in an extrusion direction of the extruder, thereby preventing the resin from flowing out of the extruder through vent 6.

The screw revolution rate was set at 300 rpm, and degassing was conducted at vent 6 under a reduced pressure of 20 mmHg. Extruded strands discharged from the die (having 6 holes, each having a diameter of 3 mm) were cooled with ice and then, pelletized to obtain pellets of a flame retardant polycarbonate resin composition.

The extrusion characteristics in Example 4 and the properties of the resin composition obtained in Example 4 were evaluated by the same methods as in Example 1. The results are shown in Table 2.

COMPARATIVE EXAMPLE 5

The production of a flame retardant polycarbonate resin composition was conducted in substantially the same manner as in Example 4, except that the feeding rate of the raw material mixture 3a-1 was changed to 10 kg/hr, and the feeding rate of Phosphate-1 was changed to 1.4 kg/hr.

The extrusion characteristics in Comparative Example 5 and the properties of the resin composition obtained in Comparative Example 5 were evaluated by the same methods as in Example 1. The results are shown in Table 2.

EXAMPLE 5

The production of a flame retardant polycarbonate resin composition was conducted in substantially the same manner as in Example 4, except that the composition of raw material mixture 3a-1 was changed as follows.

(Composition of the Raw Material Mixture 3a-1)

PC-2:80 parts by weight

ABS-2:10 parts by weight

SAN 10 parts by weight

Mixture of Additive-1 and Additive-2 (Additive-1:Additive-2=10:1):0.1 part by weight Dis. PTFE:0.5 part by weight The extrusion characteristics in Example 5 and the properties of the resin composition obtained in Example 5 were evaluated by the same methods as in Example 1. The results are shown in Table 2.

COMPARATIVE EXAMPLE 6

The production of a flame retardant polycarbonate resin composition (in the form of pellets) was conducted in substantially the same manner as in Example 5, except that the feeding rate of the raw material mixture 3a-1 was changed to 10 kg/hr, and the feeding rate of Phosphate-1 was changed to 1.4 kg/hr.

The extrusion characteristics in Comparative Example 6 and the properties of the resin composition obtained in Comparative Example 6 were evaluated by the same methods as in Example 1. The results are shown in Table 2.

TABLE 2

|  | Example 4 | Example 5 | Comparative Example 5 | Comparative Example 6 |
|---|---|---|---|---|
| Screw revolution rate [rpm] | 300 | 300 | 300 | 300 |
| Production rate of the resin composition [kg/hr] | 22.8 | 22.8 | 11.4 | 11.4 |
| Organic phosphorus compound | Phosphate-1 | Phosphate-1 | Phosphate-1 | Phosphate-1 |
| Acid value of the organic phosphorus compound [mgKOH/g] | 0.01 | 0.01 | 0.01 | 0.01 |
| Temperature of the molten resin (measured at the die) [° C.] | 275 | 277 | 282 | 284 |
| Residence time of the resin component in the extruder [sec] | 23 | 26 | 43 | 45 |
| Flame retardancy [20 MM Vertical Burning Test described in UL-Subject 94 (thickness of test specimen: 1/16")] | V-0 | V-0 | V-0 | V-0 |
| Change in Izod impact strength at 80° C. and 95 RH % (measured with respect to a notched 1/8" specimen) [kgf · cm/cm] 0 hr | 68 | 64 | 66 | 55 |
| 24 hr | 62 | 52 | 53 | 35 |
| 48 hr | 52 | 41 | 28 | 22 |
| 96 hr | 42 | 33 | 15 | 18 |
| 144 hr | 35 | 20 | 14 | 15 |
| 192 hr | 24 | 18 | 12 | 12 |

TABLE 2-continued

|  | Example 4 | Example 5 | Comparative Example 5 | Comparative Example 6 |
|---|---|---|---|---|
| Change in YI value at 80° C. and 95 RH % 0 hr | 1.2 | 0.5 | 3.3 | 2.4 |
| 24 hr | 2.3 | 1.5 | 5.8 | 3.5 |
| 48 hr | 3.5 | 3.4 | 6.4 | 4.6 |
| 96 hr | 4.3 | 4.2 | 7.8 | 8.8 |

EXAMPLE 6

The production of a flame retardant polycarbonate resin composition was conducted in substantially the same manner as in Example 4, except that the composition of raw material mixture 3a-1 was changed as follows.

(Composition of the Raw Material Mixture 3a-1)

PC-3:80 parts by weight

ABS-1:14 parts by weight

SAN:3 parts by weight

MBS 3 parts by weight

Mixture of Additive-1 and Additive-2 (Additive-1:Additive-2=10:1):0.1 part by weight PTFE-containing powdery polymer blend: 0.8 part by weight The extrusion characteristics in Example 6 and the properties of the resin composition obtained in Example 6 were evaluated by the same methods as in Example 1. The results are shown in Table 3.

COMPARATIVE EXAMPLE 7

The production of a flame retardant polycarbonate resin composition was conducted in substantially the same manner as in Example 6, except that Phosphate-3 was used instead of Phosphate-1.

The extrusion characteristics in Comparative Example 7 and the properties of the resin composition obtained in Comparative Example 7 were evaluated by the same methods as in Example 1. The results are shown in Table 3.

TABLE 3

|  | Example 6 | Comparative Example 7 |
|---|---|---|
| Screw revolution rate [rpm] | 300 | 300 |
| Production rate of the resin composition [kg/hr] | 22.8 | 22.8 |
| Organic phosphorus compound | Phosphate-1 | Phosphate-3 |
| Acid value of the organic phosphorus compound [mgKOH/g] | 0.01 | 0.51 |
| Temperature of the molten resin (measured at the die) [° C.] | 281 | 282 |
| Residence time of the resin component in the extruder [sec] | 25 | 26 |
| Flame retardancy [20 MM Vertical Burning Test described in UL-Subject 94 (thickness of test specimen: 1/16")] | V-0 | V-0 |
| Change in Izod impact strength at 80° C. and 95 RH% (measured with respect to a notched 1/8" specimen) [kgf · cm/cm] 0 hr | 67 | 66 |
| 24 hr | 59 | 46 |
| 48 hr | 55 | 25 |
| 96 hr | 43 | 24 |
| 144 hr | 40 | 18 |
| 192 hr | 32 | 14 |

TABLE 3-continued

|  |  | Example 6 | Comparative Example 7 |
|---|---|---|---|
| Change in YI value at 80° C. and 95 RH% | 0 hr | 1.3 | 3.1 |
|  | 24 hr | 1.8 | 4.1 |
|  | 48 hr | 4.3 | 5.2 |
|  | 96 hr | 4.8 | 9.5 |

Industrial Applicability

By the method of the present invention, it has become possible to produce a flame retardant polycarbonate resin composition containing an organic phosphorus compound as a flame retardant, in which not only a lowering of the mechanical properties but also a deterioration of the color can be greatly suppressed even under high temperature and high humidity conditions. Therefore, the method of the present invention is commercially very advantageous.

What is claimed:

1. In a method for producing a flame retardant polycarbonate resin composition by kneading together:

a resin component mainly comprising a polycarbonate, and an organic phosphorus compound, in a screw extruder comprising one or more supply inlets for said resin component and said organic phosphorus compound, and an extrusion outlet for a flame retardant resin composition obtained by said kneading, the improvement wherein the method comprises:

continuously feeding said resin component to said extruder through the supply inlet, while continuously feeding said organic phosphorus compound to said extruder through the same supply inlet as used for feeding said resin component or through a supply inlet other than used for feeding said resin component, wherein said organic phosphorus compound has an acid value of not more than 0.1 mg KOH/g, said resin component and said organic phosphorus compound being extruded toward said extrusion outlet under kneading, wherein the temperature of said resin component in the extruder is not higher than 300° C., and the residence time of said resin component in the extruder is not more than 40 seconds, to thereby produce a flame retardant polycarbonate resin composition, while withdrawing said flame retardant polycarbonate resin composition through said extrusion outlet.

2. The method according to claim 1, wherein the residence time of said resin component in the extruder is not more than 30 seconds.

3. The method according to claim 1, wherein said extruder is a twin-screw extruder.

4. The method according to claim 1, wherein said resin component fed to said extruder is in the solid state, and said extruder comprises a zone (a), a zone (b) and a zone (c) which are arranged in this order as viewed in an extrusion direction of said extruder, said zone (c) communicating directly with said extrusion outlet for the flame retardant resin composition, and wherein the resin component present in zone (a) is maintained in a non-molten state, and the resin component present in said zone (b) is maintained in a partially molten state, and the resin component present in zone (c) is maintained in a completely molten state.

5. The method according to claim 4, wherein said extruder has a supply inlet (a') for said resin component and a supply inlet (b') for said organic phosphorus compound, said supply inlet (a') communicating directly with zone (a), said supply inlet (b') communicating directly with zone (b), and wherein said resin component is fed to zone (a) through supply inlet (a'), and said organic phosphorus compound is fed to said zone (b) through supply inlet (b'), wherein the feeding rate (kg/hr) of said organic phosphorus compound is in the range of from 1 to 30%, based on the feeding rate (kg/hr) of said resin component.

6. The method according to claim 5, wherein the resin filling ratio in said extruder is increased at zone I for preventing said organic phosphorus compound from flowing back to said zone (a), said resin filling ratio being defined as a volume ratio of the resin component to an inner space of said extruder, said zone I being positioned in zone (b) and positioned upstream of the feeding point of said organic phosphorus compound as viewed in an extrusion direction of said extruder, and wherein the kneading of said resin component and said organic phosphorus compound is performed mainly in a region II downstream of the feeding point of said organic phosphorus compound as viewed in an extrusion direction of said extruder.

7. The method according to claim 1, wherein said resin component comprises a polycarbonate and a rubber-modified resin.

8. The method according to claim 1, wherein said organic phosphorus compound is at least one compound selected from the group consisting of compounds represented by the following formula (I):

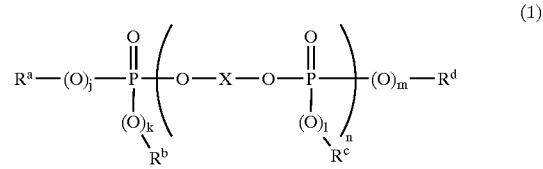

(1)

wherein:

X represents

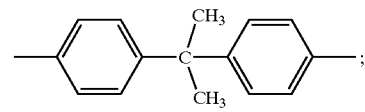

each of $R^a$, $R^b$, $R^c$ and $R^d$ independently represents a $C_6$–$C_{12}$ aryl group;

n represents an integer of 1 to 5; and each of j, k, l and m independently represents 0 or 1.

9. The method according to claim 1, wherein said organic phosphorus compound contains metal-atoms in an amount of not more than 30 ppm and chlorine atoms in an amount of not more than 20 ppm.

10. The method according to claim 1, wherein a fluoropolymer is further fed to said extruder.

11. The method according to claim 4, wherein said extruder has one or more inlets (a') communicating directly with zone (a), and wherein said resin component is continuously fed to zone (a) through supply inlet (a'), and an aqueous dispersion of a fluoropolymer is continuously fed to zone (a) separately from said resin component through the same supply inlet (a') as used for feeding said resin component or through a supply inlet (a') other than used for feeding said resin component, wherein the feeding rate (kg/hr) of said aqueous dispersion of the fluoropolymer is in the range of from 0.01 to 10%, based on the feeding rate (kg/hr) of said resin component.

12. The method according to claim 11, wherein said aqueous dispersion of a fluoropolymer fed to zone (a) of said extruder has a temperature of from 5 to 30° C.

13. A shaped article obtained by molding the flame retardant polycarbonate resin composition produced by the method of any one of claims 1 to 12.

* * * * *